(12) United States Patent
Kato et al.

(10) Patent No.: US 7,472,296 B2
(45) Date of Patent: Dec. 30, 2008

(54) INTEGRATED CIRCUIT, SEMICONDUCTOR DEVICE AND ID CHIP

(75) Inventors: Kiyoshi Kato, Sagamihara (JP); Jun Koyama, Sagamihara (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 349 days.

(21) Appl. No.: 11/054,611

(22) Filed: Feb. 10, 2005

(65) Prior Publication Data

US 2005/0210302 A1   Sep. 22, 2005

(30) Foreign Application Priority Data

Feb. 20, 2004   (JP) .............. 2004-043903

(51) Int. Cl.
*G06F 1/26* (2006.01)
(52) U.S. Cl. .................. 713/320; 713/300; 713/322
(58) Field of Classification Search ................ 713/320, 713/300, 322
See application file for complete search history.

(56) References Cited

U.S. PATENT DOCUMENTS

| | | | | |
|---|---|---|---|---|
| 5,621,412 | A * | 4/1997 | Sharpe et al. ............ | 340/10.33 |
| 5,632,023 | A * | 5/1997 | White et al. ................ | 712/218 |
| 5,945,920 | A * | 8/1999 | Maletsky .................. | 340/10.52 |
| 6,029,006 | A * | 2/2000 | Alexander et al. .......... | 713/323 |
| 6,031,781 | A | 2/2000 | Tsuji et al. | |
| 6,035,357 | A | 3/2000 | Sakaki | |
| 6,765,434 | B2 * | 7/2004 | Mizuno ...................... | 327/544 |
| 6,826,705 | B2 | 11/2004 | Tani | |
| 7,112,952 | B2 * | 9/2006 | Arai et al. ................. | 324/158.1 |
| 2002/0073348 | A1 * | 6/2002 | Tani ........................... | 713/300 |
| 2002/0107054 | A1 * | 8/2002 | Fujisawa et al. ............ | 455/573 |
| 2003/0141989 | A1 | 7/2003 | Arisawa et al. | |
| 2003/0219935 | A1 * | 11/2003 | Miyairi et al. .............. | 438/166 |
| 2004/0007706 | A1 | 1/2004 | Yamazaki et al. | |
| 2005/0091550 | A1 | 4/2005 | Tani | |
| 2005/0134435 | A1 * | 6/2005 | Koyama et al. .......... | 340/10.34 |

FOREIGN PATENT DOCUMENTS

| | | |
|---|---|---|
| CN | 1458695 | 11/2003 |
| CN | 1462412 | 12/2003 |
| EP | 0 851 336 | 7/1998 |
| JP | 10-198564 | 7/1998 |

(Continued)

OTHER PUBLICATIONS

Office Action (Application No. 200510065515.0) Dated Mar. 7, 2008.

*Primary Examiner*—Chun Cao
(74) *Attorney, Agent, or Firm*—Eric J. Robinson; Robinson Intellectual Property Law Office, P.C.

(57) ABSTRACT

A contactless semiconductor device is provided where a low power consumption is achieved and wireless communication is carried out stably. A power supply level of a reader/writer and the operating state of internal blocks of an ID chip are monitored. In accordance with such conditions, a clock signal of an optimal frequency and a power supply potential of an optimal level are selected to be supplied. By setting the operating mode in accordance with the power supply level or the power saving mode in accordance with the operating state of each block, a low power consumption ID chip and stable wireless communication can be provided.

32 Claims, 13 Drawing Sheets

FOREIGN PATENT DOCUMENTS

| | | |
|---|---|---|
| JP | 10-199253 | 7/1998 |
| JP | 11-296627 | 10/1999 |
| JP | 2000-187977 | 7/2000 |
| JP | 2001-189347 | 7/2001 |
| JP | 2002-026803 | 1/2002 |
| JP | 2002-182807 | 6/2002 |

* cited by examiner

INTEGRATED CIRCUIT, SEMICONDUCTOR DEVICE AND ID CHIP

BACKGROUND OF THE INVENTION

1. Field of the Invention

The present invention relates to an integrated circuit, a semiconductor device and an ID chip formed over a glass substrate or a flexible substrate. In addition, the invention relates to an integrated circuit, a semiconductor device and an ID chip that establish contactless communication.

2. Description of the Related Art

In recent years, a contactless IC card, ID tag, RFID or the like (hereinafter collectively referred to as an ID chip) having a high security function has been increasingly demanded for the purpose of ID management of securities, cashless electronic payment and the like by use of the ID chip. Such an ID chip incorporates highly functional integrated circuits such as a central processing circuit (typically referred to as a central processing unit and hereinafter also abbreviated to CPU) and a dedicated hardware having a cryptographic function.

An ID chip receives a power supply through a current induced by electromagnetic induction that is generated between a radio wave from a reader/writer and an antenna in the ID chip. However, according to such a method, the amount of power supplied to the ID chip changes when the positional relationship between the ID chip in operation and the reader/writer changes, and thus a stable power supply is difficult to be achieved.

In addition, since a CPU and a logic circuit for cryptographic operation occupy large circuit areas, a large power consumption is required. When a stable power supply is unavailable and a large power consumption is required, an operating margin is decreased, which hinders the stable operation. In addition, the large circuit area will lead to a lower impact resistance of the semiconductor device, and thus the number of chips taken from a silicon wafer is decreased, which leads to a higher cost.

SUMMARY OF THE INVENTION

In view of the foregoing, the invention provides an integrated circuit, a semiconductor device and an ID chip at low cost where stable operation is achieved by suppressing the power consumption as low as possible and a high impact resistance is assured even when a large circuit area is used.

The invention provides an integrated circuit and a semiconductor device comprising a central processing circuit and a control circuit. A power supply circuit generates a plurality of power supply potentials and a clock generating circuit generates clock signals having various frequencies. The control circuit controls the power supply circuit and the clock generating circuit based on the operating state of the central processing circuit and memories and the level of an external power supply so that a power supply potential of an optimal level and a clock of an optimal frequency can be supplied to the central processing circuit. In addition, the invention provides an integrated circuit comprising a central processing circuit, a control circuit and a connecting terminal for connection to an antenna. Further, the invention provides a semiconductor device comprising a central processing circuit, a control circuit and an antenna. The invention also provides an ID chip (also referred to as a wireless chip) comprising an integrated circuit or a semiconductor device.

The control circuit controls the power supply circuit and the clock generating circuit based on the operating state of the central processing circuit so that a clock frequency and a power supply potential are decreased when a load on the central processing circuit is small, or a clock frequency and a power supply potential are increased when a load on the central processing circuit is large. By performing such control in accordance with the operating state of the central processing circuit, power consumption can be reduced to the least possible degree. Specifically, the control circuit controls the power supply circuit and the clock generating circuit based on an event signal generated by the central processing circuit. The event signal is a signal selected from one or more of a signal containing data on the operating state of an integer operation unit, a floating point operation unit, a load/store unit or a branch unit included in the central processing circuit, a signal containing data on the execution state of various instructions from a plurality of units included in the central processing circuit such as an integer operation instruction, a floating point operation instruction, a load/store instruction, a branch instruction and a NOP instruction, and a signal generated by a combinational circuit that includes several units selected from the plurality of units.

In addition, the control circuit controls the power supply circuit and the clock generating circuit based on the power supplied from a reader/writer to the semiconductor device so that a clock frequency and a power supply potential are decreased when the power supply is small, or a clock frequency and a power supply potential are increased when the power supply is large. By performing such control in accordance with the power supplied from a reader/writer to the semiconductor device, stable operation is achieved even with an unstable power supply. Needless to say, the power supply potential and the clock frequency are required to be controlled within the operating range of the central processing circuit. Specifically, each of the integrated circuit and the semiconductor device of the invention comprises a power supply level determination circuit for generating a power supply data signal. Based on the power supply data signal, the control circuit controls the power supply circuit and the clock generating circuit. The power supply determination circuit comprises a power supply circuit including a load resistor, a reference potential generating circuit, and a comparator circuit for comparing the output potential of the power supply circuit with the output potential of the reference potential generating circuit.

The control circuit may switch not only the power supply potential and the clock signal supplied to the central processing circuit but also those supplied to other integrated circuits. For example, such a configuration may be employed that clock signals of multiple frequencies and power supply potentials of multiple levels can be supplied to memories incorporated in the semiconductor device (for example, one or more of an SRAM (Static Random Access Memory), a DRAM (Dynamic Random Access Memory), an EEPROM (Electrically Erasable Programmable Read Only Memory) and a flash memory). Specifically, the control circuit controls the power supply circuit and the clock generating circuit based on a memory access signal generated by the central processing circuit. The memory access signal is a signal selected from one or more of a signal containing data on the operating state of a memory control unit included in the central processing circuit, a signal containing data on the execution state of a load/store instruction from the central processing circuit, and a signal generated by a combinational circuit that includes several units selected from the plurality of units in the central processing circuit.

The invention provides an integrated circuit and a semiconductor device formed in large quantities over a glass substrate that is larger and cheaper than a silicon wafer so as to improve cost performance. Further, the invention provides a semiconductor device that is formed by peeling elements off a glass substrate and transferring them to a flexible substrate so as to improve an impact resistance. The elements peeled off the glass substrate are 5 μm thick or less (more preferably, 0.1 to 3 μm), therefore, it may be directly stuck to a product container, a tag or the like, or a periphery thereof may be filled with an organic resin material and the like.

The flexible substrate refers a substrate having flexibility and it is typically a plastic substrate, paper and the like. The plastic includes, for example, polynorbornene having a polar group, polyethylene terephthalate (PET), polyether sulfone (PES), polyethylene naphthalate (PEN), polycarbonate (PC), nylon, polyetheretherketone (PEEK), polysulfone (PSF), polyetherimide (PEI), polyarylate (PAR), polybutylene terephthalate (PBT), polyimide and the like.

According to the invention, a highly impact-resistant semiconductor device can be provided at low cost. With the high impact resistance ensured, the semiconductor device can have various applications. Furthermore, with the low cost ensured, applications to various products or objects can be expected.

Furthermore, the invention enables a low power consumption, thereby a semiconductor device having a large operating margin and capable of stable operation can be provided. Accordingly, the reliability of the semiconductor device can be increased, which can improve the reliability of various products or objects to which the semiconductor device of the invention can be applied.

DESCRIPTION OF THE PREFERRED EMBODIMENTS

Figure 1:
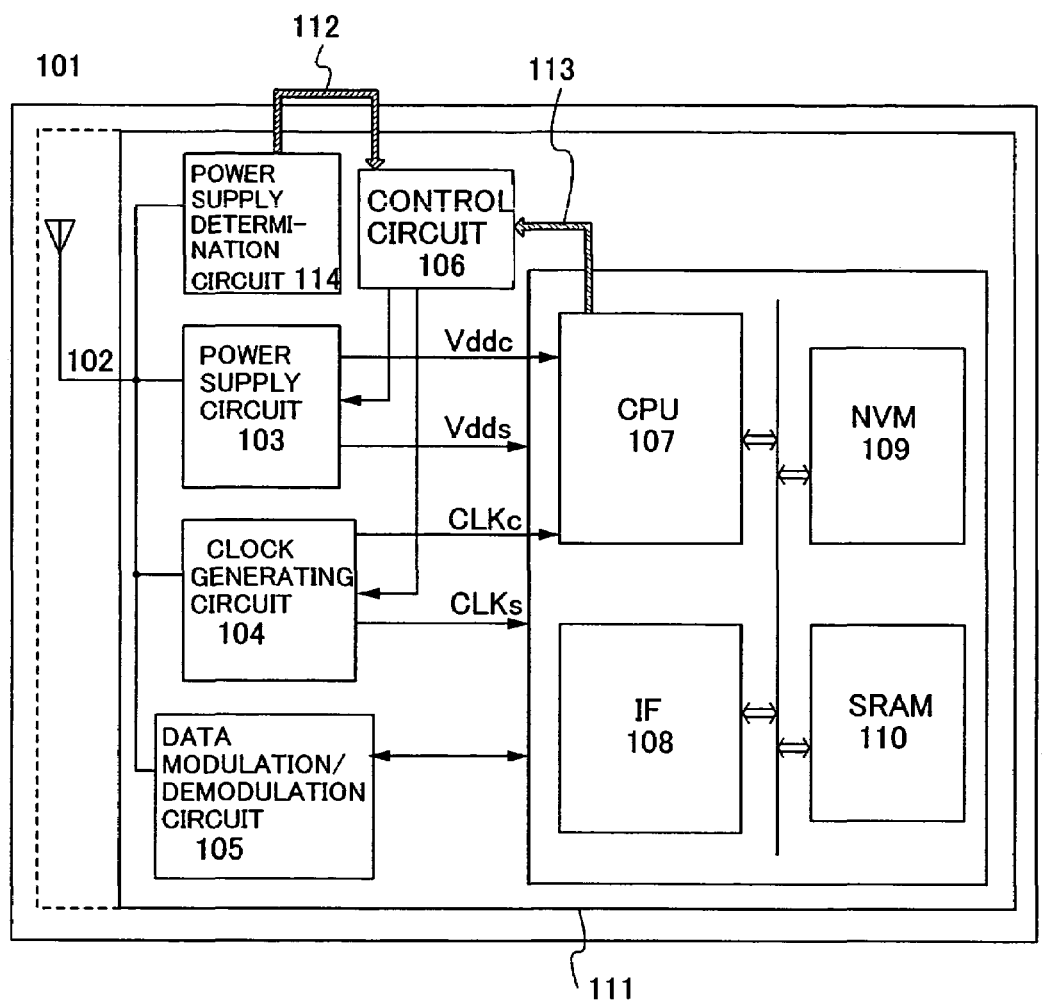
FIG. 1 is a block diagram illustrating a configuration of a semiconductor device of the invention.

Although the invention will be fully described by way of embodiment modes and embodiments with reference to the accompanying drawings, it is to be understood that various changes and modifications will be apparent to those skilled in the art. Therefore, unless such changes and modifications depart from the scope of the invention, they should be construed as being included therein. Note that in the structures of the invention described hereinafter, common components shall be denoted by common reference numerals among all the drawings, and description thereof shall be omitted.

Embodiment Mode 1

A configuration of a semiconductor device 101 of the invention is described with reference to FIG. 1. The semiconductor device 101 comprises an integrated circuit 111 and an antenna 102. The integrated circuit 111 comprises a power supply circuit 103, a clock generating circuit 104, a data modulation/demodulation circuit 105 having a data modulating/demodulating function, a control circuit 106, a circuit for determining a power supply level (hereinafter also abbreviated to a power supply determination circuit) 114, a CPU 107, an interface (denoted by an IF in the drawing) 108, a non-volatile memory (denoted by an NVM in the drawing) 109 and an SRAM 110. Note that the SRAM 110 may be substituted with a volatile memory such as a DRAM.

The integrated circuit 111 is formed over a glass substrate or a flexible substrate. The antenna 102 may be formed either over the same substrate as the integrated circuit 111 in the semiconductor device 101 or over a protective layer that is disposed on the top or bottom of the integrated circuit 111. In this manner, when forming the integrated circuit 111 and the antenna 102 over the same substrate, a printing method using nanoparticle compositions (a droplet discharging method or a screen printing method) may be employed.

In the semiconductor device 101, the integrated circuit 111 having a terminal for connection to the antenna 102 may be electrically connected to the antenna 102 comprising copper, aluminum or the like using an anisotropic conductive film or the like. Here, the semiconductor device 101 refers to a device comprising the antenna 102 and the integrated circuit 111 for enabling communication with a reader/writer. In addition, the integrated circuit 111 refers to a circuit comprising a terminal for connection to the antenna 102 instead of comprising the antenna 102.

The integrated circuit 111 has an area of 5 mm square or less, and preferably 0.3 to 4 mm square. A protective layer disposed on the top or bottom of the integrated circuit 111 is larger than the size of the semiconductor device 101.

The control circuit 106 receives a power supply data signal 112 generated by the circuit 114 for determining a power supply level and an event signal 113 generated by the CPU 107. Then, the control circuit 106 generates an instruction signal for adjusting a power supply potential Vddc and a clock signal CLKc to be supplied to the CPU 107, and a power supply potential Vdds and a clock signal CLKs to be supplied to systems other than the CPU in accordance with the power supply level, thereby transmitting them to the power supply circuit 103 and the clock generating circuit 104. When the power supply circuit 103 and the clock generating circuit 104 receive the instruction signal from the control circuit 106, they adjust the Vddc and the CLKc to be supplied to the CPU 107 and the VDDs and the CLKs to be supplied to the systems other than the CPU 107. That is, the control circuit 106 generates an instruction signal containing data for changing the power supply potential and the clock frequency to be supplied to the CPU 107 based on the event signal 113 generated by the CPU 107, and then supplies the instruction signal to the power supply circuit 103 and the clock generating circuit 104.

The power supply circuit 103 is constructed so as to enable to generate power supply potentials of 2 to 100 levels to be generated in accordance with the signal from the control circuit 106. Similarly, the clock generating circuit 104 is constructed so as to enable to generate power supply potentials of 2 to 100 levels to be generated in accordance with the signal from the control circuit 106.

The circuit 114 for determining a power supply level can generate the power supply data signal 112 by, for example, providing a small-scale power supply circuit therein, separately from the power supply circuit 103, and monitoring the stability of the power supply. Specifically, when the internal power supply is stable and a large amount of external power supplied, power supply potentials and clock frequencies supplied to the CPU 107 and the systems other than the CPU 107 are increased, thereby improving a processing speed of the semiconductor device 101. On the other hand, when the amount of an external power supply is small or when the internal power supply is unstable, power supply potentials and clock frequencies supplied to the CPU 107 and the systems other than the CPU 107 are decreased, thereby suppressing power consumption of the semiconductor device 101.

The control circuit 106 receives the event signal 113 representing the internal operating state of the CPU 107 from the CPU 107. Then, the control circuit 106 generates a signal for adjusting the power supply potential and the clock frequency at regular intervals (typically, 10 µs to 100 ms) so that the load on the CPU 107 becomes equal to the load on the other systems. The generated signal is transmitted to the power supply circuit 103 and the clock generating circuit 104. When the power supply circuit 103 and the clock generating circuit 104 receive the signal from the control circuit 106, they adjust the Vddc and the CLKc to be supplied to the CPU 107 and the Vdds and the CLKs to be supplied to the systems other than the CPU 107. That is, the control circuit 106 generates an instruction signal containing data for adjusting the power supply potential and the clock frequency to be supplied to the CPU 107 in accordance with the power supply data signal 112 generated in the circuit 114 for determining a power supply level. The generated instruction signal is supplied to the power supply circuit 103 and the clock generating circuit 104.

The event signal 113 is a signal representing various internal events of the CPU 107. The CPU 107 comprises a plurality of units. The plurality of units include various pipeline units such as an integer operation unit, a floating point operation unit, a load/store unit and a branch unit. The event signal includes a signal representing the event in the CPU 107, a signal representing the event that various instructions such as a NOP instruction, a load/store instruction and an operation instruction are executed, a signal generated by a combinational circuit that includes several units selected from the plurality of units in the CPU 107, and the like. For example, when the number of operations of the CPU 107 or cache hits is large, the power supply potential and the clock frequency supplied to the CPU 107 are increased. On the other hand, when the number of NOP instructions from the CPU 107 is large, latency time is long, or the number of operations is small, the power supply potential and the clock frequency supplied to the CPU 107 are decreased, thereby decreasing power consumption.

Note that when adjusting the power supply potential and the clock frequency, values thereof are preferably changed step by step. By changing the power supply potential and the clock frequency step by step, time required for restarting operation and a possible faulty operation can be reduced.

The relationship between the power supply potential and the clock frequency is preferably selected so that the selected supply potential can accommodate an operation at the highest clock frequency. The power supply potential and the clock frequency are adjusted within the operating range of the integrated circuit 111. In particular, when the power supply level drops extremely low, a method for cutting a power supply can be adopted.

In this embodiment mode, the CPU 107 and the systems other then the CPU 107 are controlled by adjusting two kinds of power supply potentials and clock frequencies each, however, the invention is not limited to these. For example, only the power supply potential and the clock frequency supplied to the CPU 107 may be controlled. In particular, when the power consumed in the CPU 107 occupies most of the system, for example, the scale of the control circuit 106 can be effectively reduced.

According to the functions of the control circuit 106 as set forth above, the semiconductor device 101 can constantly operate in accordance with the external power supply. Further, wasteful power consumption such that the CPU 107 wastes its processing capacity can be suppressed to the least possible degree. As a result, the power consumption of the semiconductor device 101 can be suppressed, enabling a stable operation even with a small power supply. Thus, communicable distance between the semiconductor device 101 and the reader/writer and the operating margin can be improved.

Embodiment Mode 2

Figure 2:
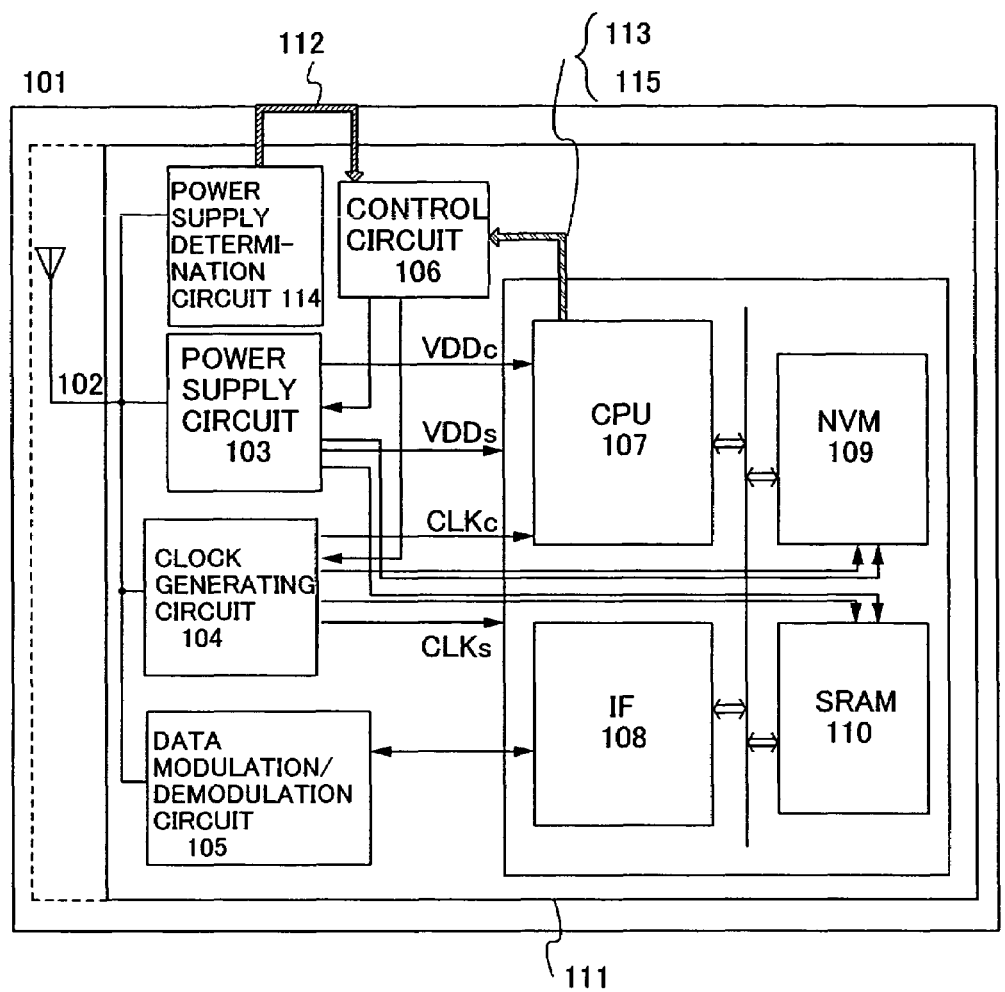
FIG. 2 is a block diagram illustrating a configuration of a semiconductor device of the invention.

The configuration of the semiconductor device 101 of the invention is described with reference to FIG. 2. In this embodiment mode, a mode is shown where the control circuit 106 controls memories such as an SRAM and an NVM in addition to the CPU 107.

The semiconductor device 101 has similar components to the semiconductor device 101 shown in FIG. 1 although it is partially different as for the control signal, the power supply potential and the clock signal. What are different from the semiconductor device 101 shown in FIG. 1 are mainly that the control circuit 106 controls a power supply potential and a clock signal supplied to each memory (the NVM 109 and the SRAM 110), and that the control circuit 106 receives a memory access signal 115 in addition to the power supply data signal 112 and the event signal 113.

The semiconductor device 101 in this embodiment mode sets an operating mode of a power supply potential and a clock signal correspondingly to the operating state of each memory. By controlling the operating mode correspondingly to the operating state per memory, power consumption can be reduced without decreasing the processing capacity of the system.

When the semiconductor device 101 includes a non-volatile memory (the NVM 109), three operating modes: a read mode, a write mode and a standby mode are set, for example. The non-volatile memory includes an EPROM, an EEPROM, a flash memory, a ferroelectric memory (FRAM or FeRAM), a magnetic memory (MRAM), a phase change memory (PRAM or OUM) and the like. Typically, the NVM 109 is often read out data, requires a relatively large current to be written data, and data thereof can be maintained even when the power of a memory cell or a decoder is turned OFF in the standby state. Therefore, the aforementioned memories are preferably employed for the NVM 109.

Specifically, the control circuit 106 determines the mode of the NVM 109 at regular intervals based on the memory access signal 115 from the CPU 107. Then, the control circuit 106 generates a signal for adjusting the power supply potential and the clock frequency, thereby transmitting it to the power supply circuit 103 and the clock generating circuit 104. When the power supply circuit 103 and the clock generating circuit 104 receive the signal from the control circuit 106, they adjust the supply potential and the clock signal to be supplied to the NVM 109 respectively, thereby entering each operating mode. That is, the control circuit 106 generates an instruction signal containing data for adjusting the power supply potential and the clock frequency supplied to the NVM 109 based on the memory access signal 115 generated by the CPU 107, and the instruction signal is supplied to the NVM 109.

When the semiconductor device 101 includes the SRAM 110, two operating modes: a normal mode and a standby mode are set, for example. Since the SRAM 110 is a volatile memory, a constant power supply is required even in the standby mode. However, power consumption can be reduced by decreasing the supply potential within the range that allows the data of the memory cell to be maintained. Note that a DRAM may substitute for the SRAM as well. Specifically, the control circuit 106 determines the mode of the SRAM 110 at regular intervals based on the memory access signal 115 from the CPU 107. Then, the control circuit 106 generates a signal for adjusting the power supply potential and the clock frequency to be supplied to the power supply circuit 103 and the clock generating circuit 104. When the power supply circuit 103 and the clock generating circuit 104 receive the signal from the control circuit 106, they adjust the power supply potential and the clock signal to be supplied to the SRAM 110 respectively, thereby entering each operating mode.

Description is made now on the memory access signal 115 and the selection of operating modes. The memory access signal 115 is generated by the CPU 107 for controlling the memory access. The memory access signal 115 may be, for example, a signal representing that a load/store instruction to the NVM 109 or the SRAM 110 is executed, and a signal generated by setting the interface between the NVM 109 and the SRAM 110 or generated by a combinational circuit thereof and the like.

Typically, it is preferable that the control circuit 106 changes the operating mode not per memory access by the CPU 107 but per several hundreds to several tens of thousands of cycles.

For example, the control circuit 106 counts the number of access to each memory for a certain period. If the number of accesses is small, it is determined that the memory access would be in pause for a while, thereby the memory can enter the standby mode. Also, if it is determined by a program that a certain memory is not accessed, the memory can enter the standby mode.

If a memory in the standby mode is accessed without intention, the CPU 107 is informed of the memory being in the standby mode. Specifically, if a memory in the standby mode is accessed, the CPU 107 issues an interrupt request to suspend the memory access. In parallel with such operation, the memory returns to a predetermined mode, and the memory access is resumed after the return. Alternatively, the CPU 107 may check whether a memory to be accessed is in the standby mode or not, and the access instruction is interrupted if the memory is in the standby mode so that the memory returns to a predetermined mode.

In this manner, by putting an unused memory in the standby mode individually, power consumption can be reduced without decreasing the processing capacity of the system. With regard to the control of the power supply potential and the clock signal supplied to the CPU 107 that is described in Embodiment Mode 1, operating modes can be set similarly to the control of each memory, thereby switching each mode using the control circuit 106.

Embodiment 1

Figure 3:
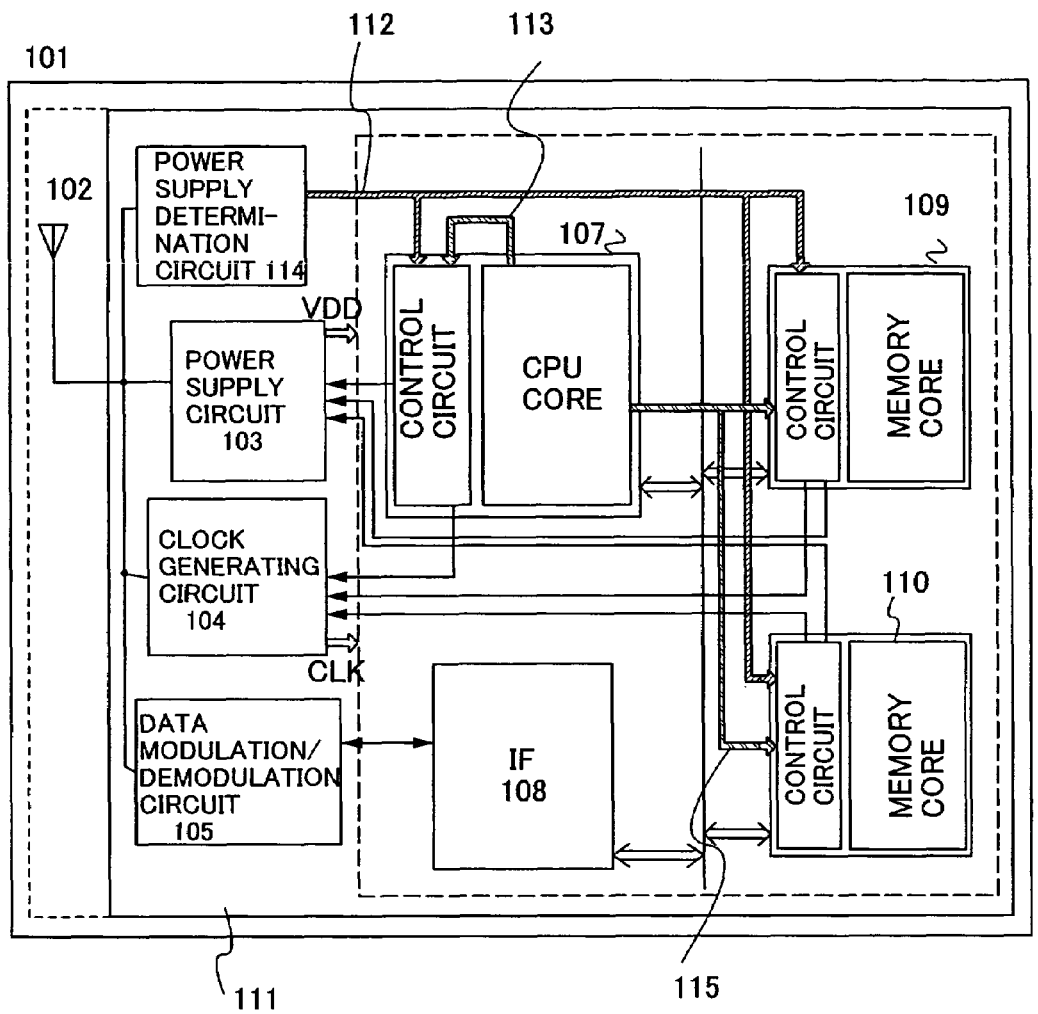
FIG. 3 is a block diagram illustrating a configuration of a semiconductor device of the invention.
Figure 4:
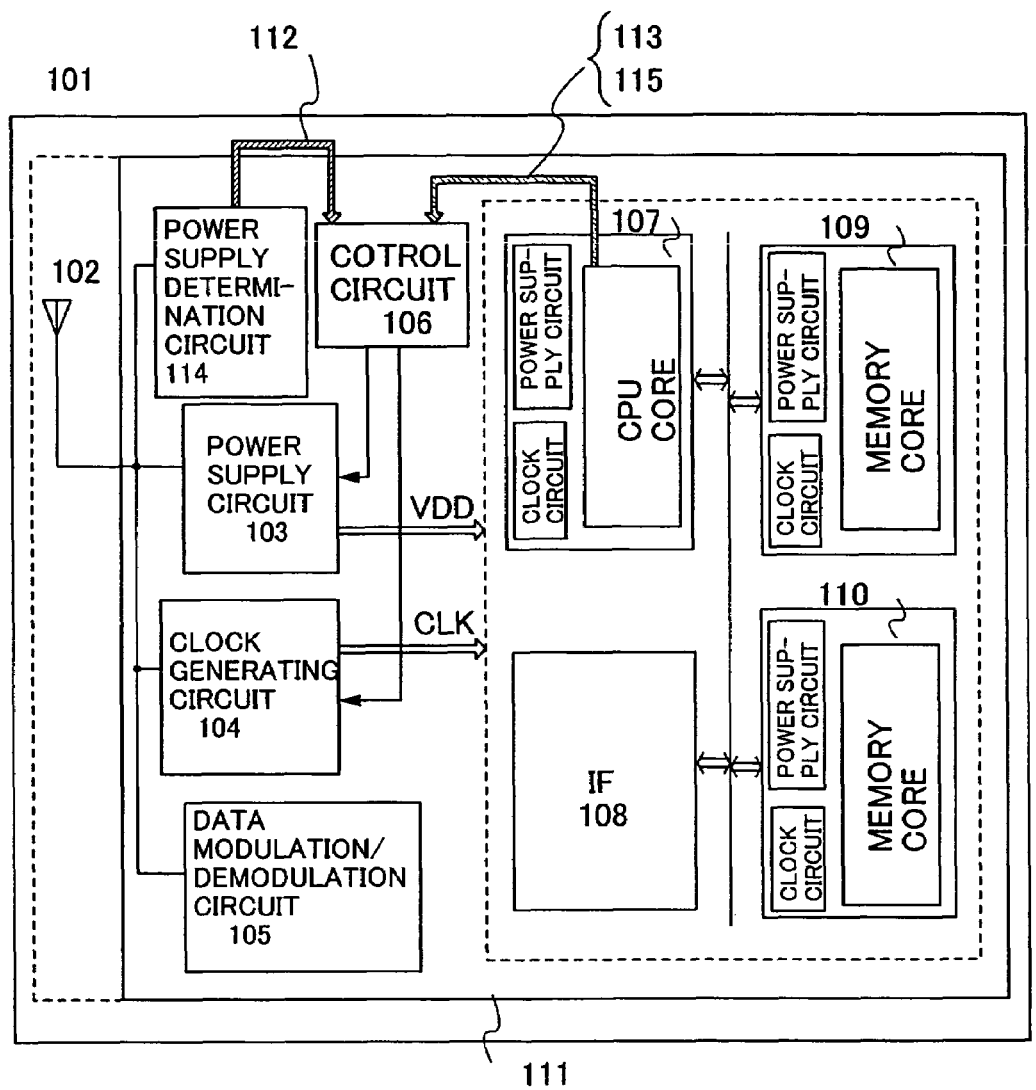
FIG. 4 is a block diagram illustrating a configuration of a semiconductor device of the invention.
Figure 5:
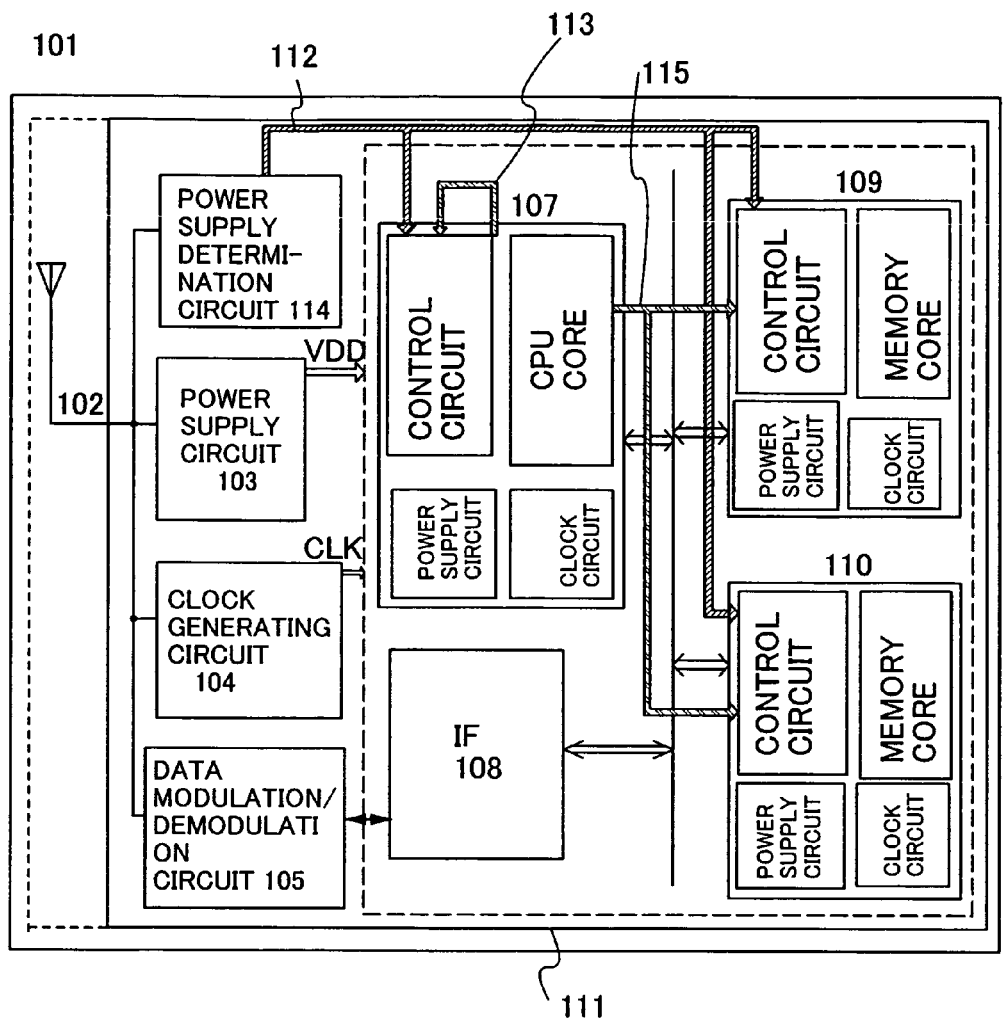
FIG. 5 is a block diagram illustrating a configuration of a semiconductor device of the invention.

In this embodiment, description is made on a power supply circuit for generating a power supply potential, a clock generating circuit and a control circuit each having a different configuration from the aforementioned embodiment modes with reference to FIGS. 3 to 5. Note that common circuits and signals among FIGS. 3 to 5 are denoted by common reference numerals.

First, description is made on the example where a control circuit is provided in each block of the CPU, the NVM and the SRAM with reference to FIG. 3.

When a control circuit is provided in each of the CPU 107, the NVM 109 and the SRAM 110, each of the control circuits receives the power supply data signal 112. The control circuit generates an instruction signal for adjusting the power supply potential and the clock frequency in accordance with the power supply level within the range that the total power consumption of each block does not surpass the power supply. The generated instruction signal is transmitted to the power supply circuit 103 and the clock generating circuit 104. When the power supply circuit 103 and the clock generating circuit 104 receive the signal from the control circuit, they adjust the power supply potential and the clock signal to be supplied to each block respectively.

Note that the power supply circuit 103 generates power supply potentials of multiple levels and the clock generating circuit 104 generates clock signals of multiple frequencies.

The control circuit in the CPU 107 receives the event signal 113 from the CPU core. If the control circuit determines at regular intervals that the load on the CPU 107 is large, it transmits an instruction signal to the power supply circuit 103 and the clock generating circuit 104 so as to increase the power supply potential and the clock frequency to be supplied to the CPU 107 step by step. If the control circuit determines at regular intervals that the load on the CPU 107 is small, on the other hand, it transmits an instruction signal to the power supply circuit 103 and the clock generating circuit 104 so as to decrease the power supply potential and the clock frequency to be supplied to the CPU 107 step by step.

Each control circuit in the NVM 109 and the SRAM 110 receives the memory access signal 115 from the CPU 107. Then, as set forth in embodiment modes, the control circuit determines the optimal operating mode of each memory at regular intervals, thereby transmitting an instruction signal to the power supply circuit 103 and the clock generating circuit 104.

Description is made now with reference to FIG. 4 on the example where a power supply circuit and a clock circuit are provided in each of the CPU and the memories.

When a power supply circuit and a clock circuit are provided in each of the CPU 107, the NVM 109 and the SRAM 110, the power supply circuit 103 and the clock generating circuit 104 generate several kinds of basic power supply potentials and clock signals, that is, the power supply circuit and the clock generating circuit in each block generate power supply potentials of multiple levels and clock signals of multiple frequencies.

The control circuit 106 receives the power supply data signal 112, and determines the operating mode of each block so that the total power consumption of each block does not surpass the power supply, thereby transmitting an instruction signal to the power supply circuit 103 and the clock generating circuit 104. Alternatively, the control circuit 106 receives the event signal 113 and the memory access signal 115 from the CPU, and determines the operating mode of each block, thereby transmitting an instruction signal to the power supply circuit 103 and the clock generating circuit 104.

Description is made now with reference to FIG. 5 on the example where a control circuit, a power supply circuit and a clock circuit are provided in each of the CPU and the memories.

When a control circuit, a power supply circuit and a clock circuit are provided in each of the CPU 107, the NVM 109 and the SRAM 110, the power supply circuit 103 and the clock generating circuit 104 generate several kinds of basic power supply potentials and clock signals, that is, the power supply circuit and the clock circuit in each block generates power supply potentials of multiple levels and clock signals of multiple frequencies.

The control circuit in the CPU receives the power supply data signal 112 representing the power supply level from the antenna 102 and the event signal 113 from the CPU core. Then, the control circuit transmits an instruction signal to the power supply circuit 103 and the clock generating circuit 104 so as to change the operating mode in accordance with the power supply level and the operating state of the CPU. The control circuit in each of the NVM 109 and the SRAM 110 receives the power supply data signal 112 and the memory access signal 115 from the CPU core, thereby changing the operating mode of each memory.

By providing a control circuit in each of the CPU and the memories as illustrated in this embodiment, the distance between the controller and the controlled object can be shortened, which can improve the margin of the operating frequency in controlling the operating mode. In addition, by providing a power supply circuit and a clock circuit in each of the CPU and the memories, optimal power supply potentials and clock frequencies can be generated for operation of each unit.

Embodiment 2

In this embodiment, description is made on the example of a circuit for determining a power supply level.

Figure 6:
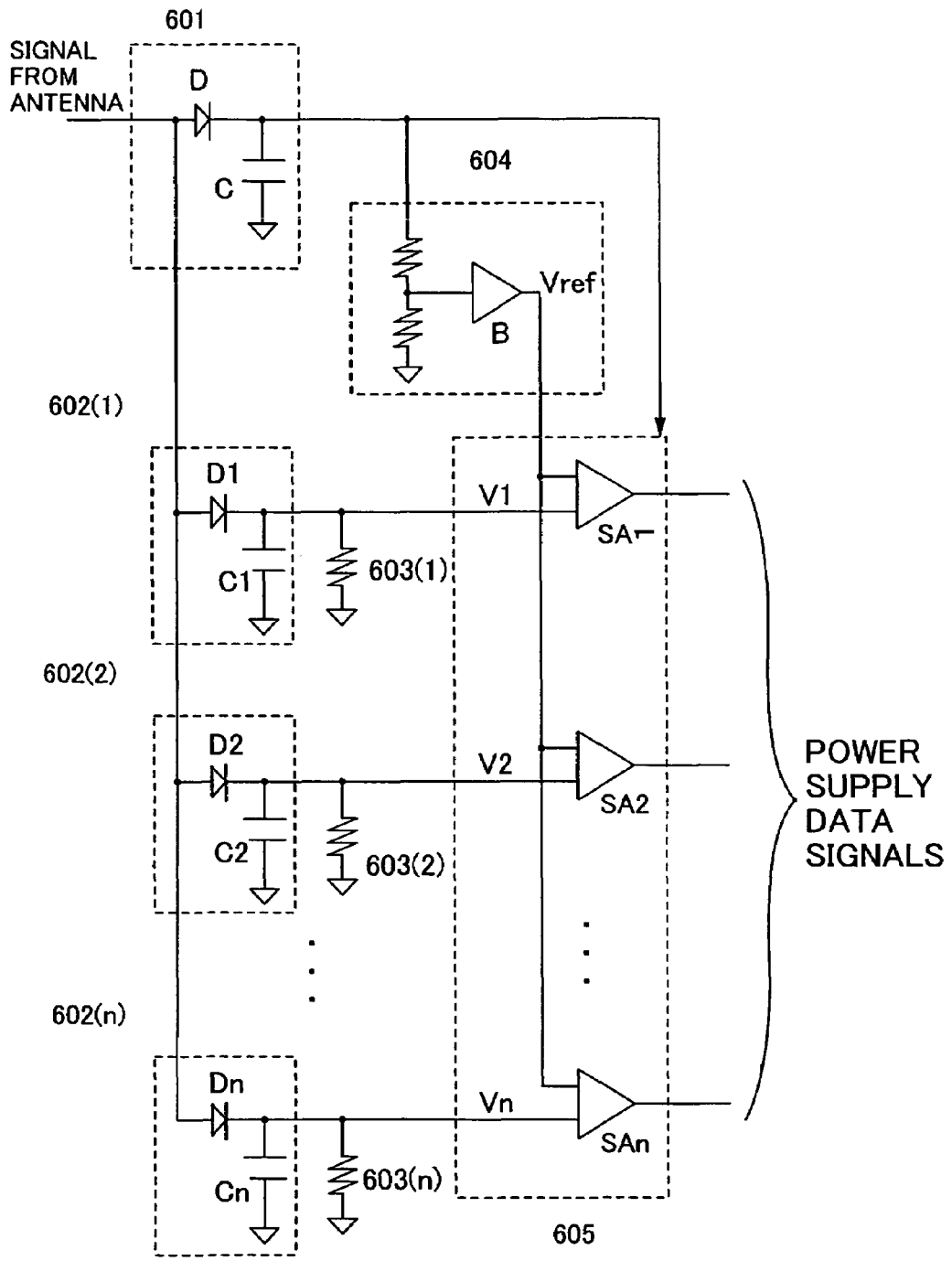
FIG. 6 is a diagram illustrating a configuration of a circuit for determining a power supply level, which generates a power supply data signal.

The circuit shown in FIG. 6 is an example of a circuit for determining a power supply level, which receives signals from an antenna. The circuit of FIG. 6 comprises a medium-scale power supply circuit 601 for generating power for the whole circuit operation, a plurality of small-scale power supply circuits 602(1) to 602(n), a plurality of resistors 603(1) to 603(n), a reference potential generating circuit 604 and a comparator circuit 605.

In FIG. 6, "C" denotes a capacitor, "D" denotes a diode, "B" denotes an analog buffer and "SA" denotes a differential amplifier.

Each of the power supply circuits includes a diode and a capacitor. The reference potential generating circuit 604 generates Vref through resistance division, which is then amplified by an analog buffer to be outputted. The comparator circuit 605 is a circuit for comparing two analog potentials using differential amplifiers.

In the circuit of FIG. 6, power generated in the small-scale power supply circuit 602 is connected to GND through the resistor 603 so as to generate a plurality of potentials V through a potential drop. Then, the potential V is compared with the common reference potential Vref in the comparator circuit 605. The comparison result is outputted as a digital signal for transmitting data of the power supply level.

The plurality of potentials V1 to Vn are analog potentials that are determined by the power supply capacity of the power supply circuit and the power consumption of the resistor. Provided that n=3 and a parameter of each circuit is appropriately selected so as to satisfy V1>V2>V3, the power supply level can be expressed by four levels of power supply signals: (1, 1, 1), (1, 1, 0), (1, 0, 0) and (0, 0, 0) in order from the highest level. That is, when the power supply level is high, a potential drop caused by the resistor is small, and each of the V1 to V3 has a potential higher than the Vref, thereby (1, 1, 1) is outputted. On the other hand, when the power supply level is low, a potential drop caused by the resistor is large, and each of the V1 to V3 has a potential lower than the Vref, thereby (0, 0, 0) is outputted.

Note that the medium-scale power supply circuit 601 has a power supply capacity that ensures the stable operation of the whole circuit even when the power supply level is low.

The circuit for determining a power supply level is not limited to the one shown in FIG. 6, and may be constructed by using a known power supply circuit, potential generating circuit or comparator circuit. In addition, it may have a configuration where a power supply level is determined by generating a plurality of reference potentials to be compared with a single potential V that is obtained through a potential drop.

Embodiment 3

In this embodiment, description is made on applications of the semiconductor device of the invention. The semiconductor device shown in this embodiment may be the one formed over a glass substrate or the one transferred to a flexible substrate in consideration of an impact resistance and the like.

The semiconductor device of the invention incorporates highly functional integrated circuits such as a CPU, a dedicated hardware for cryptographic operation and the like, and enables a wide range of communication stably with a low power consumption, therefore, the semiconductor device can be mounted on various objects that require high security. The "high security" means, to be specific, prevention of theft or forgery.

Figure 7A:
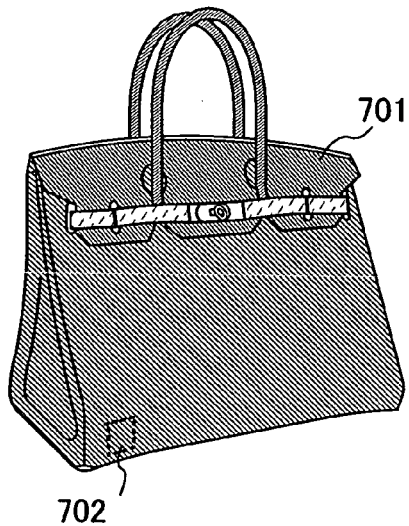
FIGS. 7A to 7C are views illustrating applications of a semiconductor device.

As an example of the prevention of theft, description is given where an ID chip is mounted on a product. For example, as shown in FIG. 7A, an ID chip 702 is mounted on a part of a bag 701 such as the bottom or the side faces.

Since the ID chip 702 is quite thin and small, it can be mounted on the bag 701 without degrading the original design. In addition, since the ID chip 702 transmits light and thus is difficult to identify the presence or a mounting place thereof, there is no fear that someone takes off the ID 702 for stealing. The ID chip can be mounted not only on a bag but on various products such as an automobile, a vehicle such as a bicycle, a watch and accessories.

Further, in the case where a product mounting such an ID chip is stolen, a positional data of the product can be obtained by using a GPS (Global Positioning System). Other than the stolen object, the positional data of things left behind or lost can be obtained by using a GPS. Note that the GPS is a system for determining a position by calculating the time difference between the time a signal is transmitted from a GPS satellite and the time it is received.

Description is made now on the illustrative examples for prevention of forgery where an ID chip is mounted on a passport, a driver's license and the like.

Figure 7B:
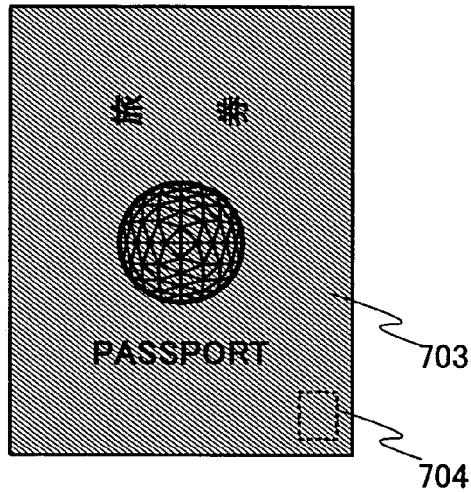

FIG. 7B illustrates an example where an ID chip 704 is mounted on a passport 703. In FIG. 7B, the ID chip 704 is mounted on the front page of the passport 703, however, it may be mounted other pages or the surface of the passport 703 since it transmits light. Also, it may be mounted inside the front page in such a manner that it is sandwiched by materials of the front page and the like.

Figure 7C:
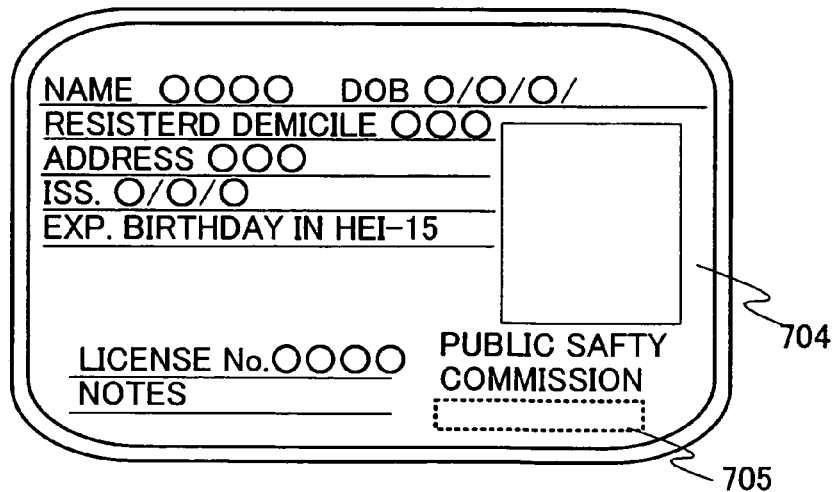

FIG. 7C illustrates an example where an ID chip 706 is mounted on a driver license 705. In FIG. 7C, the ID chip 706 is mounted inside the driver license 705, however, it may be mounted on the printed surface of the license 705 since it transmits light. For example, the ID chip 706 may be mounted on the printed surface of the driver license 705 and then sealed with a laminate film. Alternatively, the ID chip 706 may be mounted inside the driver license 705 in such a manner that it is sandwiched by the materials of the driver license 705. Since the ID chip is quite small and thin, it may be mounted on a passport, license, product or the like without degrading the original design.

By mounting an ID chip on such objects, counterfeiting can be prevented. In addition, when mounting an ID chip on a premium product such as a bag as set forth above, forgery can be prevented.

In addition, when incorporating an ID chip in an object, management of a passport, a license, a product and the like can be carried out easily. In particular, since the input data of the passport, the license and the like can be stored in a memory in the ID chip, one's privacy can be protected.

Embodiment 4

In this embodiment, description is made on a specific manufacturing method of a thin film integrated circuit device including TFTs with reference to FIGS. 8A to 8E, 9A to 9D, and 10A to 10D. TFT is an abbreviation for a thin film transistor, and it refers to a transistor comprising a thin film active layer and formed over a glass substrate and the like. Here, description is made on the manufacturing method of TFTs with reference to the cross-sectional structure of an N-channel TFT and a P-channel TFT.

Figure 8A:
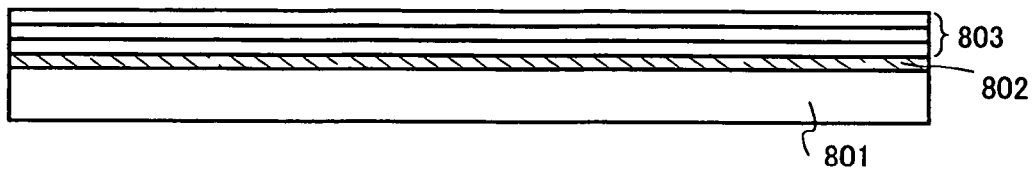
FIGS. 8A to 8E are diagrams illustrating the manufacturing steps of a semiconductor device.

First, a peeling layer 802 is formed over a substrate 801 (FIG. 8A). Here, an a-Si film (amorphous silicon film) is formed by low pressure CVD to have a thickness of 50 nm (500 Å) over a glass substrate (e.g., Corning Glass 1737). The substrate may be formed of, other than the glass substrate, a quartz substrate, a substrate formed of an insulating material such as alumina, a silicon wafer substrate, a plastic substrate having heat resistance to the processing temperature in the subsequent steps, and the like.

The peeling layer is desirably formed of, in addition to the amorphous silicon film, a film containing silicon as a main component such as a polycrystalline silicon film, a single crystalline silicon film and an SAS (semi-amorphous silicon; also referred to as microcrystalline silicon) film, however, the invention is not limited to these. The peeling layer may be formed not only by low pressure CVD but by plasma CVD, sputtering and the like. In addition, a film doped with impurities such as phosphorous may be employed as well. The peeling layer desirably has a thickness of 50 to 60 nm. When using SAS, the peeling layer may have a thickness of 30 to 50 nm.

Next, a protective film 803 (also referred to as a base film or a base insulating film) is formed over the peeling layer 802 (FIG. 8A). Here, the protective layer 803 has three layers of SiON film (100 nm)\SiNO film (50 nm)\SiON film (100 nm), however, the invention is not limited to such materials, thickness and the number of the layers. For example, instead of the lower SiON film, a heat-resistant resin such as siloxane may be formed by spin coating, slit coating, droplet discharge or the like to have a thickness of 0.5 to 3 μm. Alternatively, a silicon nitride film (SiN, $Si_3N_4$ or the like) may be employed.

Siloxane is a material having a backbone structure of Si—O bond, and having as a substituent at least one of hydrogen, fluorine, alkyl group and aromatic hydrocarbon. Each film is desirably formed with a thickness of 0.05 to 3 μm, and the thickness may be appropriately selected within the range.

A protective layer in contact with the bottom or top portion of a TFT as the protective layer 803 is desirably formed of a material such as silicon oxide and silicon nitride that blocks alkaline metal.

Here, the silicon oxide film can be formed by thermal CVD, plasma CVD, atmospheric pressure CVD, bias ECRCVD or the like using a mixed gas, such as $SiH_4/O_2$, or TEOS (tetraethoxysilane)/$O_2$, or the like. Typically, the silicon nitride film can be formed by plasma CVD using a mixed gas of $SiH_4/NH_3$. The SiON film or the SiNO film can typically be formed by plasma CVD using a mixed gas of $SiH_4/N_2O$.

In the case of using a material containing silicon such as a-Si as a main component for the peeling layer 802 and an island-like semiconductor film 804, $SiO_xN_y$ may be employed so as to secure adhesiveness.

Then, thin film transistors (TFT) for constituting a CPU and a memory of a thin film integrated circuit device are formed over the protective film 803. Other than the TFTs, thin film active elements such as organic TFTs and thin film diodes can be formed. Note that the TFTs or organic TFTs on the protective layer 803 may be collectively referred to as an active element group in some cases.

Figure 8B:
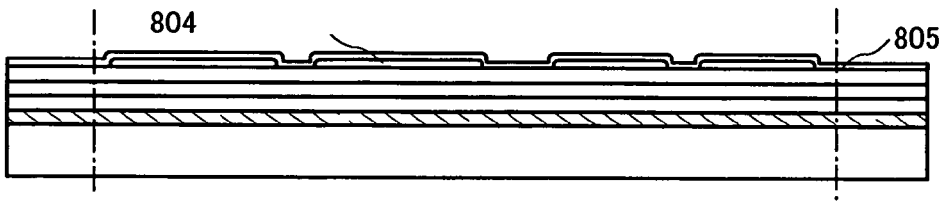

As the manufacturing method of a TFT, the island-like semiconductor film 804 is formed on the protective film 803 (FIG. 8B). The island-like semiconductor film 804 comprises an amorphous semiconductor, a crystalline semiconductor, or a semi-amorphous semiconductor. In any, a semiconductor film containing silicon, silicon germanium (SiGe) or the like as a main component can be employed.

Here, amorphous silicon is formed with a thickness of 70 nm and the surface thereof is treated with a solution containing nickel. Then, thermal crystallization is performed with a temperature of 500 to 750° C. to obtain a crystalline semiconductor film. Further, laser crystallization is performed thereto in order to improve crystallinity. As for the deposition method, plasma CVD, sputtering, LPCVD or the like may be employed. As for the crystallization method, laser crystallization, thermal crystallization or crystallization using catalysts (Fe, Ru, Rh, Pd, Os, Ir, Pt, Cu, Au or the like) may be employed. Alternatively, such crystallization steps may be repeated alternately.

As for the crystallization of the semiconductor film having an amorphous structure, a continuous wave laser may be employed. In order to obtain crystals of a large grain size in crystallization, a continuous wave solid-state laser is employed, in which case the second to fourth harmonic waves of the fundamental wave are preferably employed (such crystallization is referred to as a CWLC). Typically, the second harmonic wave (532 nm) or the third harmonic wave (355 nm) of an Nd:$YVO_4$ laser (the fundamental wave of 1064 nm) may be employed. When using a continuous wave laser, laser light irradiated from a continuous wave $YVO_4$ laser of which output is 10 W is converted into a higher harmonic using a non-linear optical element. Also, there is a method that a $YVO_4$ crystal or $GdVO_4$ crystal is put together with a non-linear optical element in a resonator, thereby irradiating a higher harmonic. Then, the light is preferably transformed into rectangular or elliptical laser light on the irradiation surface using an optical system so as to be irradiated to the object. The laser density at this time is required to be about 0.01 to 100 $MW/cm^2$ (preferably 0.1 to 10 $MW/cm^2$). Then, the laser light may be irradiated relatively to the semiconductor film by moving the semiconductor film at a rate of about 10 to 2000 cm/s.

When using a pulsed wave laser, a frequency bandwidth of about several tens to several hundreds Hz is employed, however, a pulsed wave laser having a much higher oscillating frequency, that is 10 MHz or more may be employed as well (such crystallization is referred to as MHzLC). It is generally said that it takes several tens to several hundreds nsec for a semiconductor film to be solidified completely after being irradiated with pulsed wave laser light. Therefore, by using the aforementioned laser light having a high oscillating frequency, a semiconductor film can be irradiated with the subsequent laser light before it is solidified by melting due to the previous laser light. Accordingly, the solid-fluid interface in the semiconductor film can be moved continuously, differently from the case of using a conventional pulsed wave laser. Thus, a semiconductor film having crystal grains that are aligned along the scan direction can be formed. Specifically, an aggregation of crystal grains can be obtained where the crystal grains in the scan direction are 10 to 30 μm wide while the crystal grains in the perpendicular direction to the scan direction are 1 to 5 μm wide. By forming crystal grains of single crystals to be aligned along the scan direction, a semiconductor film having few crystal grains at least in the channel direction of a TFT can be obtained.

Note that when using siloxane which is a heat-resistant organic resin for a part of the protective film 803, it can be prevented that heat leaks from the semiconductor film during the aforementioned crystallization, whereby crystallization can be carried out efficiently.

According to the aforementioned method, a crystalline silicon semiconductor film is obtained. Note that the crystals are desirably aligned along the direction of the source, channel and drain. In addition, the thickness of the crystalline layer is preferably 20 to 200 nm (typically, 40 to 170 nm or more preferably 50 to 150 nm). After that, an amorphous silicon film for gettering metal catalysts is deposited over the semiconductor film with an oxide film Interposed therebetween, and gettering is carried out by thermal treatment with a temperature of 500 to 750° C. In order to control the threshold voltage of the TFT element, boron ions are implanted at a dosage of about $10^{13}/cm^2$ figure into the crystalline silicon semiconductor film. After that, etching is performed with a resist mask so as to form the island-like semiconductor film 804.

Note that the crystalline semiconductor film can also be obtained by directly forming a polycrystalline semiconductor film by LPCVD (low pressure CVD) using a source gas of disilane ($Si_2H_6$) and germanium fluoride ($GeF_4$). For example, such conditions are provided: the gas flow rate of $Si_2H_6/GeF_4=20/0.9$, the deposition temperature at 400 to 500° C. and carrier gas of He or Ar is employed. However, the invention is not limited to these.

It is preferable that a channel region of a TFT be added with hydrogen or halogen of $1\times10^{19}$ to $1\times10^{22}$ cm$^{-3}$ or more preferably of $1\times10^{19}$ to $5\times10^{20}$ cm$^{-3}$. In the case of using SAS, such element is desirably added at a dosage of $1\times10^{19}$ to $2\times10^{21}$ cm$^{-3}$. In either case, it is desirable that the channel region of a TFT contain more amount of hydrogen or halogen contained in the single crystalline silicon of an IC chip. Accordingly, a local crack that would occur in the TFT portion can be terminated by hydrogen or halogen.

The crystalline semiconductor film manufactured in this manner preferably has an electron mobility of 10 cm$^2$V/sec or more.

Next, a gate insulating film 805 is formed over the island-semiconductor film 804 (FIG. 8B). The gate insulating film is preferably formed by a thin film deposition method such as plasma CVD, sputtering and the like to have a lamination of a single or a plurality of layers where a silicon nitride film, a silicon oxide film, a silicon nitride oxide film or a silicon oxynytride film is stacked. In the case of stacking a plurality of layers, for example, a three-layer structure is preferably employed where a silicon oxide film, a silicon nitride film and a silicon oxide film are stacked in this order on the substrate.

Figure 8C:
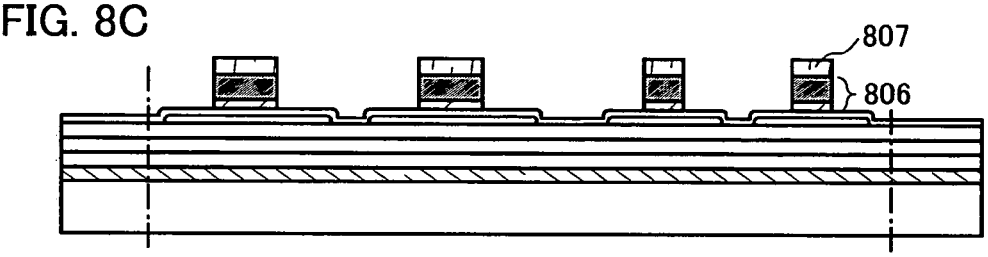
Figure 8D:
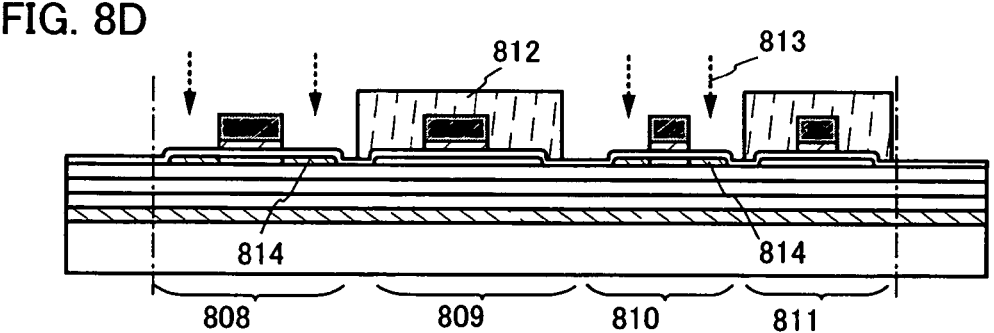
Figure 8E:
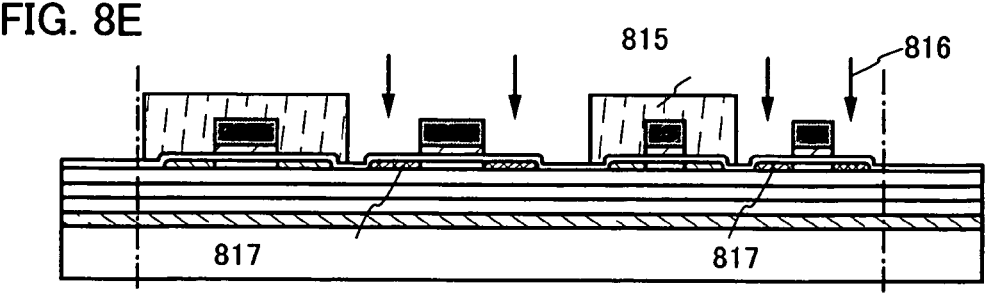

Then, a gate electrode 806 is formed (FIG. 8C). Here, the gate electrode 806 is formed by stacking Si and W (tungsten) by sputtering and subsequently etching it with a resist 807 as a mask. Needless to say, the material, structure and manufacturing method of the gate electrode 806 are not limited to such conditions, and they may be selected appropriately. For example, a stacked-layer structure of Si doped with N-type impurities and NiSi (nickel silicide), or a stacked-layer structure of TaN (tantalum nitride) and W (tungsten) may be employed. Alternatively, a single-layer structure may be employed by using various conductive materials.

Instead of the resist mask, a mask of $SiO_x$ or the like may be used as well. In such a case, an additional step is required for patterning a mask of $SiO_x$, SiON or the like (referred to as a hard mask), however, thickness of the mask is reduced less at the time of etching than using a resist mask. Thus, a gate electrode layer having a desired width can be formed. Alternatively, the gate electrode 806 may be formed selectively by a droplet discharging method without using the resist 807.

As a conductive material, various materials may be selected according to the function of the conductive film. When forming a gate electrode and an antenna at the same time, materials may be selected in consideration of the functions thereof.

As an etching gas for etching the gate electrode, a mixed gas of $CF_4$, $Cl_2$ and $O_2$, or a $Cl_2$ gas is employed herein, however, the invention is not limited to these.

Then, portions to become P-channel TFTs 809 and 811 are covered with a resist 812 so as to dope an N-type impurity element 813 (typically, P: Phosphorous or As: Arsenic) into the island-like semiconductor film in each of N-channel TFTs 808 and 810 at a low concentration (first doping step, FIG. 8D). The first doping step is carried out with the conditions: dosage of $1\times10^{13}$ to $6\times10^{13}/cm^2$, and an acceleration voltage of 50 to 70 keV. However, the invention is not limited to such conditions. According to the first doping step, through doping is performed through the gate insulating film 805, whereby a pair of low-concentration impurity regions 814 are formed. Note that the first doping step may be performed to the whole surface without covering the P-channel TFT regions.

Then, after removing the resist 812 by ashing or the like, a resist 815 is formed covering the N-channel TFT regions so as to dope a P-type impurity element 816 (typically, B: Boron) into the island-like semiconductor film in each of the P-channel TFTs 809 and 811 at a high concentration (second doping step, FIG. 8E). The second doping step is carried out with the conditions: dosage of $1\times10^{16}$ to $3\times10^{16}/cm^2$, and an acceleration voltage of 20 to 40 keV. According to the second doping step, through doping is carried out through the gate insulating film 805, whereby a pair of high-concentration impurity regions 817 are formed.

Figure 9A:
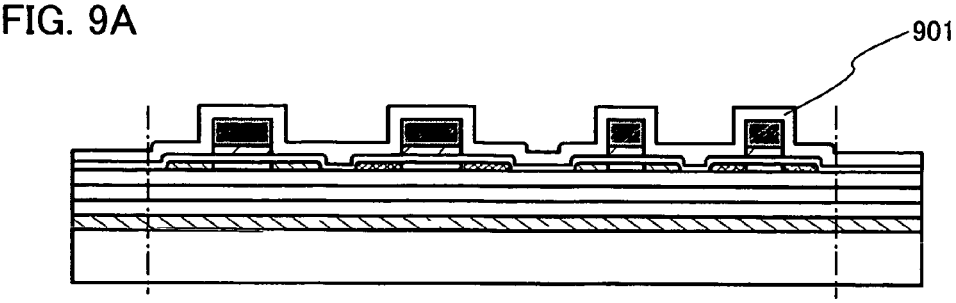
FIGS. 9A to 9D are diagrams illustrating the manufacturing steps of a semiconductor device.
Figure 9B:
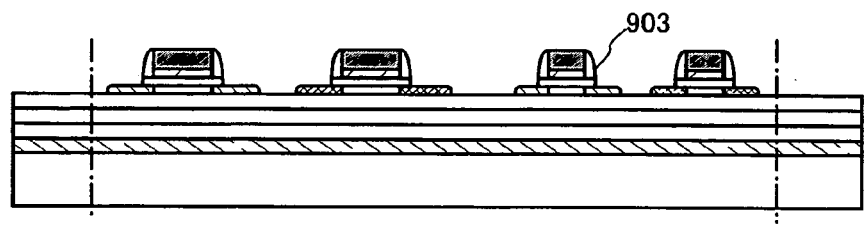

Then, after removing the resist 815 by ashing or the like, an insulating film 901 is formed over the surface of the substrate (FIG. 9A). Here, a $SiO_2$ film is formed to have a thickness of 100 nm by plasma CVD. After that, etch back is performed to remove the insulating film 901 and the gate insulating film 805, thereby forming a sidewall 903 in a self-aligned manner (FIG. 9B). As the etching gas, a mixed gas of $CHF_3$ and $H_3$ is employed. Note that the steps for forming the sidewall are not limited to these.

Figure 10A:
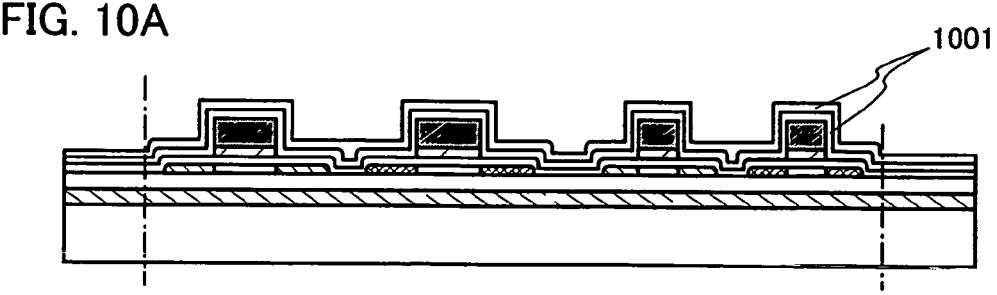
FIGS. 10A to 10D are diagrams illustrating the manufacturing steps of a semiconductor device.
Figure 10B:
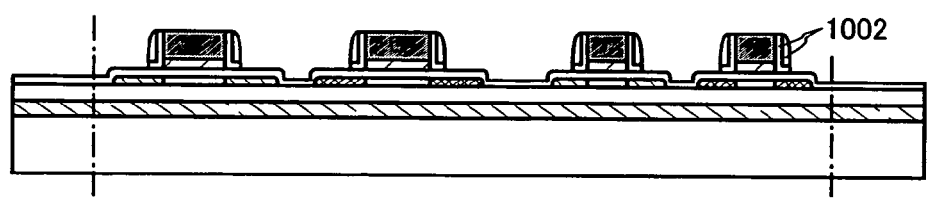

Note also that the method for forming the sidewall 903 is not limited to the aforementioned. For example, a method shown in FIGS. 10A to 10B can be employed. FIG. 10A illustrates an example where the insulating layer 1001 has a lamination of two or more layers. The insulating film 1001 has, for example, a two-layer structure of a SiON (silicon oxynitride) film with a thickness of 100 nm and an LTO (low temperature oxide) film with a thickness of 200 nm. Here, the SiON film is formed by plasma CVD while the LTO film is formed by low pressure CVD using a $SiO_2$ film. Then, etch back is performed to form the sidewall 1002 having an L-shape and circular arc shape.

Figure 10C:
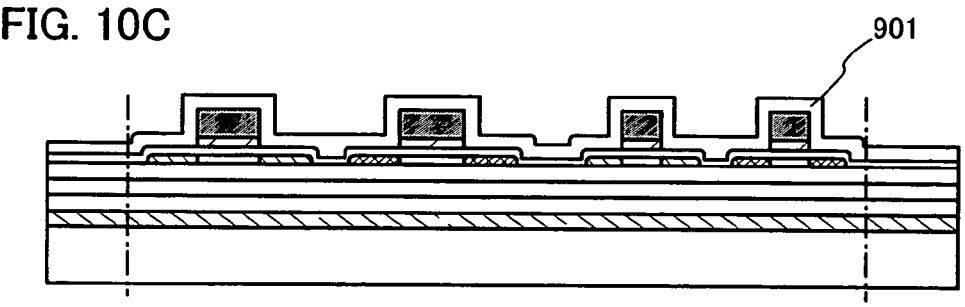
Figure 10D:
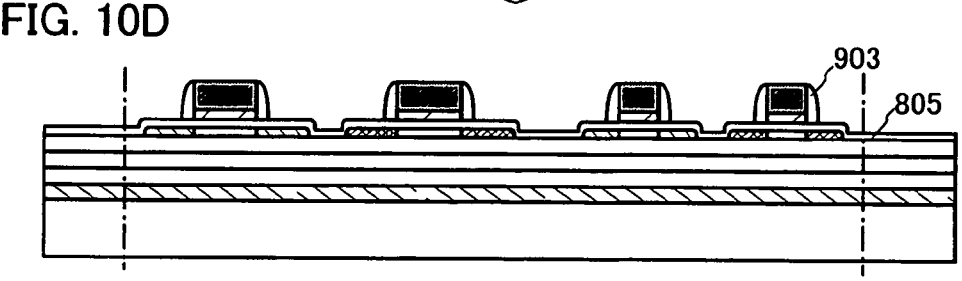

FIGS. 10C and 10D illustrate an example where etching is performed so as to leave the gate insulating film 805 at etch back. The insulating film 901 in this case may have either a single-layer or a multi-layer structure.

The aforementioned sidewall functions as a mask for the subsequent steps for forming a low-concentration impurity region or a non-doped offset region under the sidewall 903 by doping N-type impurities at a high concentration. In any of the aforementioned methods for forming the sidewall, the etch back conditions may be appropriately controlled according to the width of the low-concentration impurity region or the offset region to be formed.

Figure 9C:
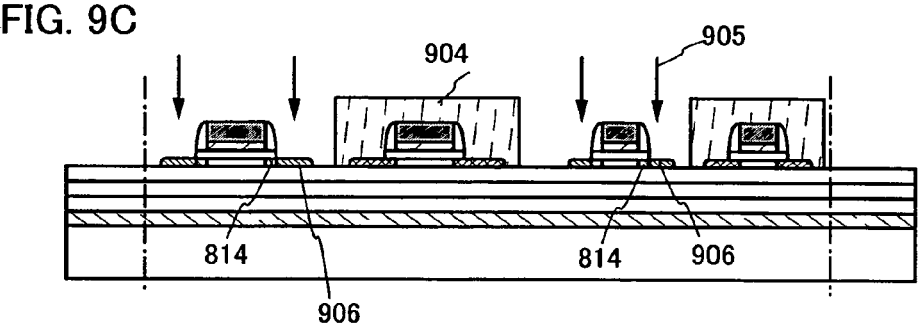

Next, as shown in FIG. 9C, a resist 904 for covering the P-channel TFT regions is formed, and an N-type impurity element 905 (typically, P or As) is doped at a high concentration using the gate electrode 806 and the sidewall 903 as masks (third doping step). The third doping step is carried out with the conditions: dosage of $1\times10^{13}$ to $5\times10^{15}/cm^2$, and an acceleration voltage of 60 to 100 keV. According to the third doping step, a pair of N-type high concentration impurity regions 906 are formed.

Note that the impurity regions may be thermally activated after removing the resist 904 by ashing or the like. For example, after forming a SiON film with a thickness of 50 nm, thermal treatment may be performed at 550° C. for 4 hours in a nitrogen atmosphere. Alternatively, by forming a $SiN_x$ film containing hydrogen with a thickness of 100 nm, and subsequently performing thermal treatment thereto at 410° C. for 1 hour in a nitrogen atmosphere, defects in the crystalline semiconductor film can be improved. This is performed, for example, in order to terminate dangling bonds existing in crystalline silicon, and referred to as a hydrogenation step. After that, a SiON film is formed with a thickness of 600 nm as a cap insulating film for protecting the TFTs. Note that the hydrogenation step may be performed after forming the SiON film. In this case, the $SiN_x$ film\SiON film can be formed continuously. In this manner, the insulating film having three layers of SiON\$SiN_x$\SiON is formed over the TFTs. Note that the structure or materials thereof are not limited to these. In addition, since such an insulating film also has a function to protect the TFTs, it is preferably provided.

Figure 9D:
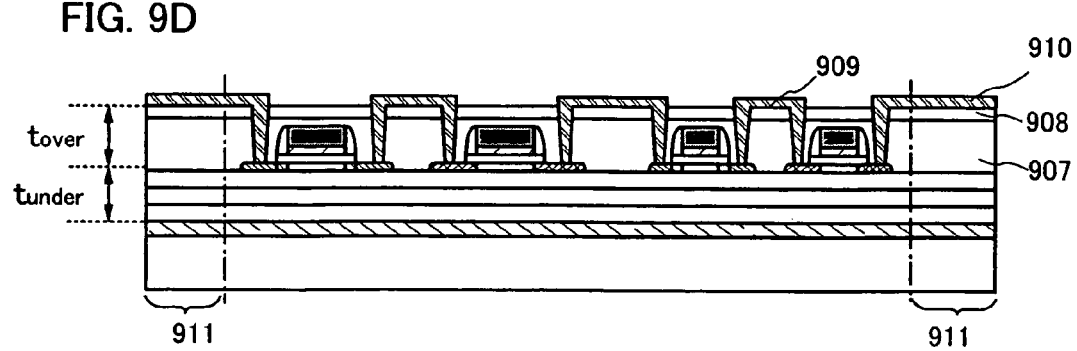

Then, an interlayer insulating film 907 is formed over the TFTs (FIG. 9D). The interlayer insulating film 907 can be formed by using a heat-resistant organic resin such as polyimide, acrylic, polyamide and siloxane. As for the method for forming the insulating film, spin coating, dipping, spray coating, a droplet discharging method (ink-jetting, screen printing, offset printing or the like), doctor knife, roll coater, curtain coater, knife coater or the like may be employed. In addition, an inorganic material may be employed as well, in which case a silicon oxide film, a silicon nitride film, a silicon nitride oxide film, a silicon oxynitride film, a PSG (phosphosilicate glass), BPSG (borophosphosilicate glass), an alumina film or the like can be employed. Note that the interlayer insulating film 907 may be formed by stacking such films as well.

Further, a protective film 908 may be formed over the interlayer insulating film 907. The protective film 908 may be formed of a carbon film such as a DLC (diamond-like carbon) film and a CN (carbon nitride) film, a silicon oxide film, a silicon nitride film, a silicon nitride oxide film or the like. As the method for forming the protective film, plasma CVD, atmospheric plasma CVD or the like may be employed. Alternatively, a photosensitive or non-photosensitive organic material such as polyimide, acrylic, polyamide, resist and benzocyclobutene can be employed as well as a heat-resistant organic resin such as siloxane.

Note that a filler may be mixed in the interlayer insulating film 907 or the protective film 908 in order to prevent peeling or cracks of the interlayer insulating film 907 and the protective film 908 that would occur due to the difference between the thermal expansion coefficients of the film and a conductive material or the like for forming a wiring to be formed later.

A resist is formed and etching is performed to open a contact hole, then a wiring 909 for connecting TFTs and a connecting wiring 910 connect to an external antenna are formed (FIG. 9D). The etching for opening the contact hole is performed using a mixed gas of $CHF_3$ and He, however, the invention is not limited to this. The wiring 909 and the connecting wiring 910 may be formed by using the same materials at the same time or formed separately. Here, the wiring 909 to be connected to the TFT has five layers of Ti \TiN\Al—Si\Ti\TiN, and they are formed by sputtering and then patterning.

Note that by mixing Si in the Al layer, hillock that would be generated in resist baking can be prevented when patterning wirings. Instead of Si, Cu of about 0.5% may be mixed as well. In addition, the hillock generation can further be suppressed by sandwiching the Al—Si layer with the Ti and/or TiN layers. Note that when patterning, the aforementioned hard mask formed of SiON or the like is desirably employed. Note also that the materials and formation method of the wirings are not limited to these, and the aforementioned material used for forming the gate electrode may be employed as well.

Note that description is made in this embodiment on the case where only the TFT regions and the connecting terminal 911 to be connected to an antenna are formed integrally, however, this embodiment can also be applied to the case where the TFT regions and the antenna are formed integrally. In such a case, the antenna is formed over the interlayer insulating film 907 or the protective film 908, which is then covered with another protective film preferably. The antenna may be formed of a conductive material such as Ag, Au, Al, Cu, Zn, Sn, Ni, Cr, Fe, Co and Ti, or an alloy of such materials. However, the invention is not limited to these. The wiring and the antenna may be formed of different materials as well. Note that the wiring and the antenna are preferably formed of metal materials having superior malleability and extensibility, and more preferably, they are formed thick enough to stand the stress that would be applied due to deformation.

As a method for forming the wiring and the antenna, they may be deposited over the whole surface by sputtering, and then patterned using a resist mask. Alternatively, they may be formed selectively by a droplet discharging method using nozzles. Note that the droplet discharging method includes, not only ink-jetting, but offset printing, screen printing and the like. The wiring and the antenna may be formed at the same time, or one of them may be formed first and the other may be formed thereon.

Through the aforementioned steps, a thin film integrated circuit device comprising TFTs can be completed. When constructing a ring oscillator using the TFTs formed in such a manner, it has an oscillating frequency of 1 MHz or more, and more preferably 100 MHz or more with a power supply voltage of 3 to 5 V. In addition, delay time per stage of inverters is 26 nsec or less, and more preferably 0.26 nsec or less with a similar power supply voltage.

In this embodiment, TFTs of a top-gate structure are formed, however, they may be of a bottom-gate structure (inversely staggered structure) as well. Note that the region other than the thin film active element (e.g., TFT) portions is mainly provided with a base insulating material, an interlayer insulating material and a wiring material. Such region preferably occupies 50% or more of the whole thin film integrated circuit device, and more preferably 70 to 95% thereof. Accordingly, the ID chip can be bent more easily, which facilitates the handling of the completed ID label and the like. In this case, island-like semiconductor regions (islands) of active elements including TFT portions preferably occupy 1 to 30% of the whole thin film integrated circuit device, and more preferably 5 to 15% thereof.

As shown in FIG. 9D, the protective layer or the interlayer film on the top and bottom portions is controlled in thickness so that the distance ($t_{under}$) between the semiconductor layer of TFTs in the thin film integrated circuit device and the protective layer on the bottom portion can become equal or substantially equal to the distance ($t_{over}$) between the semiconductor layer and the interlayer film (the protective layer if provided) on the top portion. Provided that the total thickness of the protective layers on the top and bottom portions is "d", the semiconductor layer is desirably located within the range of 1/2d+30 µm in each side. That is, it is preferable that (1/2d−30) µm<<X<<(1/2d +30) µm be satisfied, and more preferable that (1/2d−10) µm<<X<<(1/2d+10) µm be satisfied. In this manner, by disposing the semiconductor layer in the middle of the thin film integrated circuit device, stress applied to the semiconductor layer can be alleviated while preventing generation of cracks.

Embodiment 5

In this embodiment, description is made on applications of the semiconductor device of the invention that is transferred to a flexible substrate. The semiconductor device of the invention is quite thin, and the semiconductor device that is transferred to a flexible substrate is flexible, which can therefore be mounted on sheet-form objects. Description is made below on the case where the semiconductor device is mounted on a bill as an example of the sheet-form object.

Figure 11A:
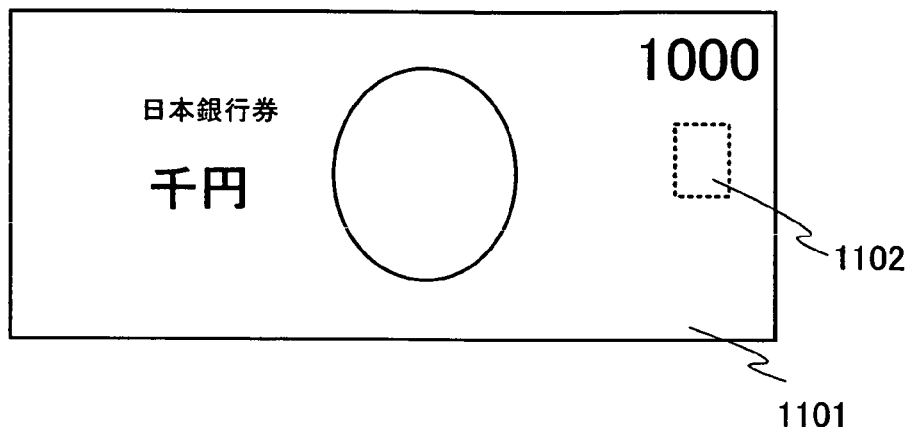
FIGS. 11A to 11C are view illustrating applications of a semiconductor device.

As shown in FIG. 11A, an ID chip 1102 is mounted on a bill 1101. FIG. 11A illustrates a mode where the ID chip 1102 is mounted in the bill, however, it may be exposed to the surface. Alternatively, the ID chip may be mounted in such a manner that ink containing the ID chip is used for printing a bill, or the ID chip is mixed with the materials of the bill. The ID chip of the invention can be produced at low cost, therefore, production cost of bills can be hardly affected even by mounting a plurality of ID chips.

In addition, higher security can also be achieved by mounting the ID chip on securities other than bills such as stock certificates, checks and coins.

Figure 11B:
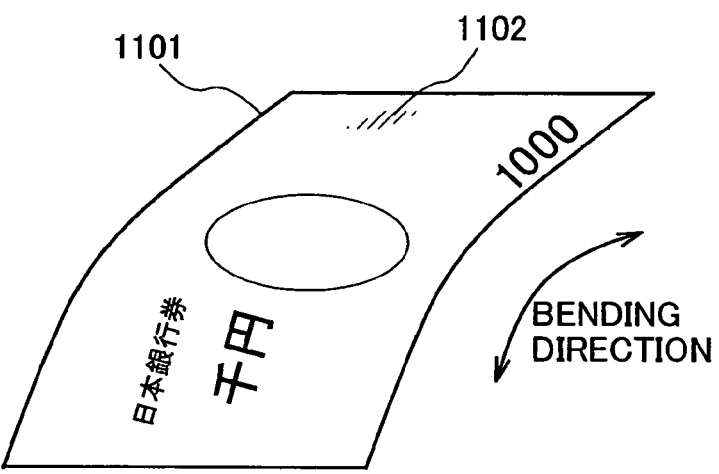

However, since such sheet-form objects are bent frequently, bending stress applied to the ID chip has to be taken into consideration. In general, sheet-form objects are likely to be bend or easily bent in the longitudinal direction, therefore, description is made below on the case where a bill mounting an ID chip is bent in the longitudinal direction as shown by an arrow with reference to FIG. 11B.

Figure 11C:
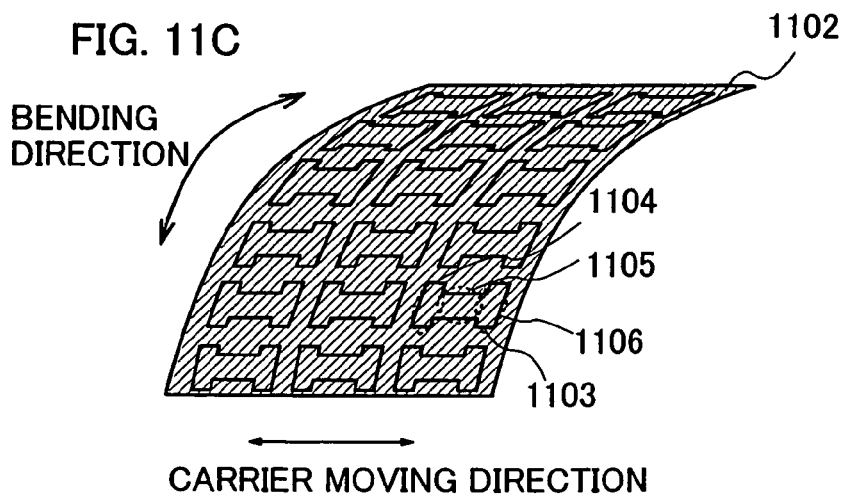

FIG. 11C illustrates the state of the ID chip for this case. The ID chip comprises a plurality of thin film transistors 1103 each of which includes a source region 1104, a channel forming region 1105 and a drain region 1106. Such an ID chip 1102 is preferably disposed so that the direction of the arrow (bending direction) is perpendicular to the moving direction of carriers. That is, the direction where the source region 1104, the channel forming region 1105 and the drain region 1106 of the thin film transistor 1103 are aligned is disposed perpendicularly to the bending direction. In addition, when a crystalline semiconductor film formed by laser irradiation is used for the thin film transistor, the laser scan direction is also set perpendicularly to the bending direction. As a result, damage or peeling of the thin film transistor that might occur due to the bending stress can be prevented.

In addition, by setting a patterned semiconductor film to occupy 1 to 30% of the whole area of the ID chip, damage or peeling of the thin film transistor that might occur due to the bending stress can be prevented.

Further, the ID chip of the invention that is transferred to a flexible substrate can be mounted on a product container such as a food container, which enables safety management and distribution management.

Figure 12A:
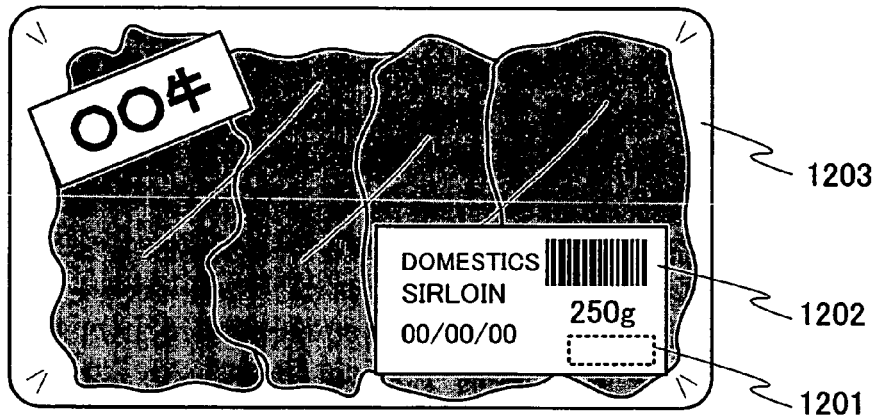
FIGS. 12A to 12C are views illustrating applications of a semiconductor device.

FIG. 12A illustrates an example of safety management of a product where a label 1202 mounting an ID chip 1201 is mounted on a pack 1203 of meet. The ID chip that is transferred to a flexible substrate is flexible and can thus be mounted along the shape of a product to a certain degree. Therefore, the ID chip 1201 can be mounted on the surface of the label 1202 or inside the label 1202. When the invention is applied to fresh food such as vegetables, an ID chip may be mounted on a plastic wrap for covering the fresh food.

Memory areas of the ID chip 1201 can store basic data concerning the production district, producer, pack date, expiration date and the like of the product as well as an application data such as a recipe using the product.

In order to carry out safety management of food, it is essential for consumers to know the conditions of plants and animals before being processed. Therefore, it is preferable that plants and animals be supervised by attaching or embedding an ID chip to/in the plants and animals being raised. The data of the plants and animals includes breeding areas, feed, breeders, infection of contagious diseases and the like.

Further, when ID chips store the product price, products mounting the ID chips can be paid all at once. Therefore, payment of products can be made in shorter time and more simply than using a conventional barcode. Depending on the communication distance of the ID chips, payment can be made even with a far distance between the cash register and the products. Therefore, such function can be applied to prevention of shoplifting. However, when reading out a plurality of ID chips at a time, the reader device is required to be equipped with an anticollision function that enables data transmission/reception with a plurality of ID chips at a time.

In addition, the ID chip can be used in combination with a barcode, a magnetic tape or other data mediums. For example, it is preferable that a basic data such as a suggested retail price that is not required to be rewritten be stored in the ID chip while optional data such as a discount price or a bargain price that is required to be updated be stored in the barcode. This is because the barcode can modify data more simply than the ID chip.

By mounting the ID chip in this manner, a larger amount of product data can be provided for consumers. Therefore, consumers can purchase the products with a safe conscience.

Figure 12B:
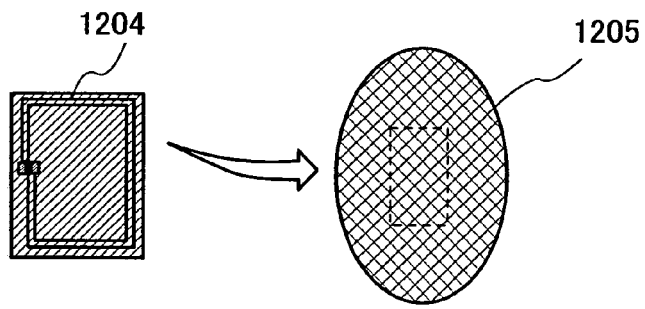
Figure 12C:
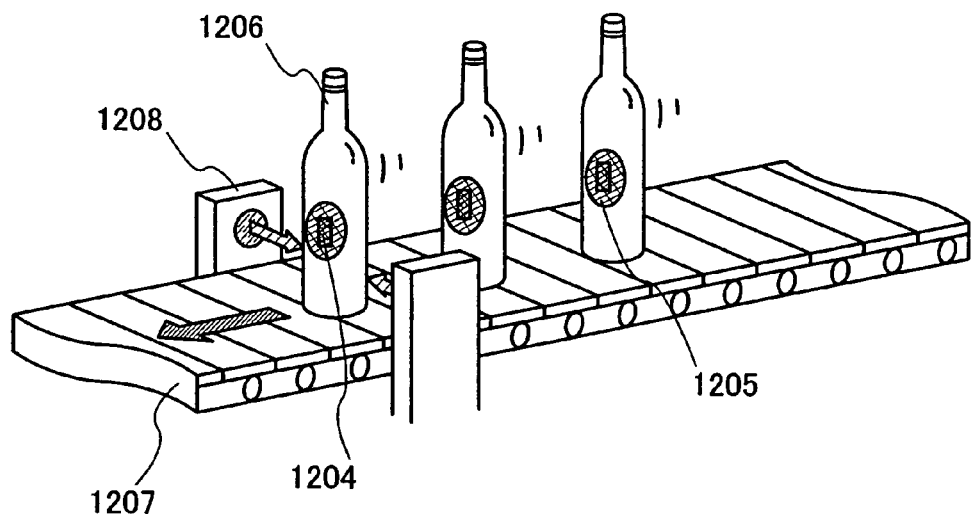

Description is made now on an example of distribution management where an ID chip is mounted on a product container such as a beer bottle. FIGS. 12B and 12C illustrate the case where an ID chip 1204 is mounted in a label 1205, which is then stuck to a beer bottle 1206.

Memory areas of the ID chip can store data such as the delivery address and date of each beer bottle in addition to data such as a manufacturing date and district and raw materials of the beer. For example, as shown in FIG. 12C, the delivery address and date can be stored in the ID chip 1204 at the time when each beer bottle 1206 being sent on a belt conveyer 1207 passes a writing device 1208.

It is preferable to construct a system such that when data of a delivery request of a product is transmitted to a distribution management center through a communications network by using the aforementioned function, a writing device, a personal computer or the like that controls the writing device calculates the delivery address and date based on the transmitted data, thereby storing the data into an ID chip.

Further, memory areas of an ID chip may also store data of food that matches well with the product to be purchased, a recipe using the product, an advertisement of a similar product and the like. Accordingly, advertisement of food and the like can be achieved at the same time, which can also stimulate the buying inclination of consumers.

In addition, delivery of products is sometimes carried out per case, therefore, an ID chip may be mounted per case or several cases to store the individual data of products.

In particular, when there is a plurality of analogous products, time required for a manual data input or input error can be reduced by mounting an ID chip on each product. Further, since the personnel expenditure that is the most costly item in distribution management can be reduced, mounting of the ID chip enables low-cost distribution management with few errors.

By mounting the ID chip in this manner, a larger amount of product data can be provided for the consumers. Therefore, consumers can purchase the products with a safe conscience.

Embodiment 6

In this embodiment, description is made on a product mounting the semiconductor device of the invention, and a manufacturing apparatus (manufacturing robot) that is controlled based on the data of the semiconductor device in order to carry out manufacturing control.

In recent years, more consumers intend to purchase original products rather than standard products in various markets. In the case of manufacturing such original products, the production line is constructed so as to accommodate the original data of the products. For example, on the production line of automobiles that is capable of selecting painting colors freely, an ID chip may be mounted on a part of an automobile, and a painting device is controlled based on the data stored in the ID chip, whereby an automobile of the original color can be manufactured.

By mounting the ID chip, the orders of automobiles or the number of automobiles of the same color that are thrown in the production line is not required to be controlled beforehand. Thus, a program for controlling the painting device in accordance with the order or the number of automobiles is not required. In addition, the manufacturing device can operate individually based on the data of the ID chip mounted on the automobile.

In this manner, the manufacturing device can be controlled by storing in the ID chip individual data concerning the manufacturing process of products, therefore, it can be used even on the production line of the large item small scale production.

Embodiment 7

In this embodiment, description is made on a mode where an integrated circuit of the invention is used as electric money.

Figure 13:
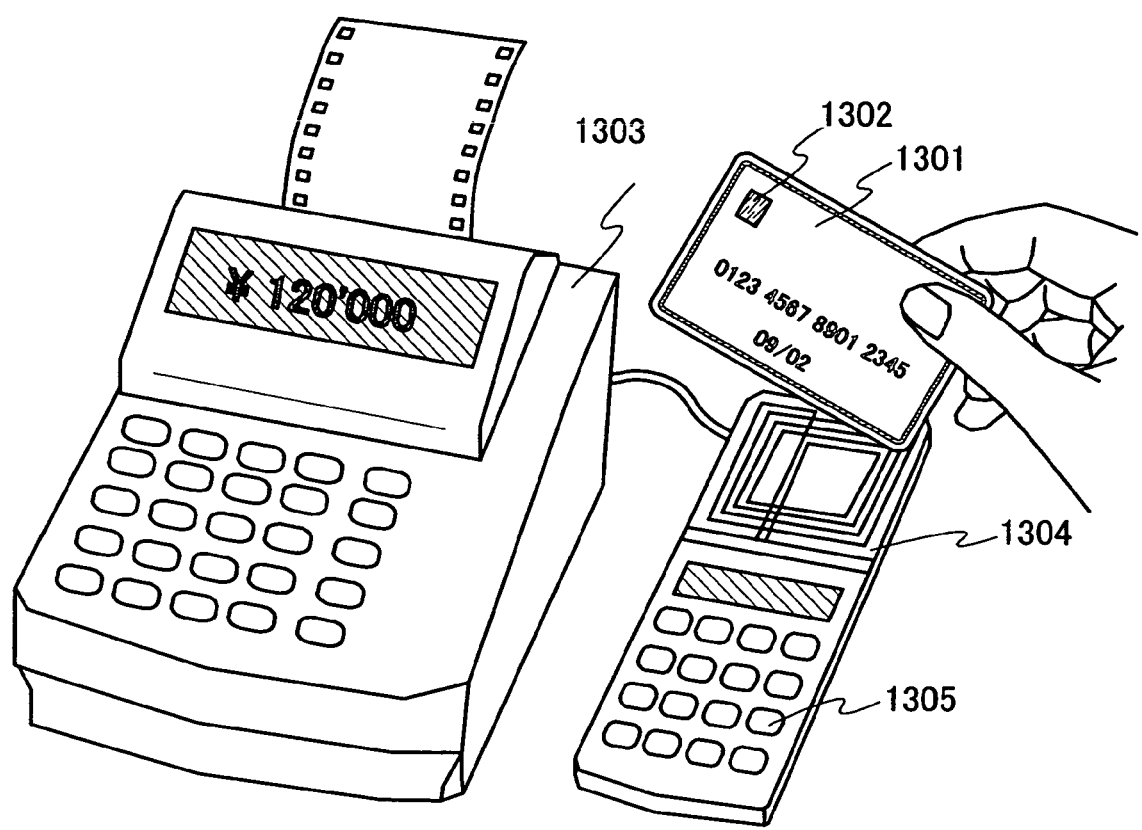
FIG. 13 is a view illustrating an application of a semiconductor device.

FIG. 13 illustrates a view of payment using an IC card 1301. The IC card 1301 includes an integrated circuit (ID chip) 1302 of the invention. Reference numeral 1303 denotes a register and 1304 denotes a reader/writer.

The integrated circuit (ID chip) 1302 stores data of the amount of money deposited in the IC card 1301. The reader/writer 1304 can read out the data of the money without contact and transmit it to the register 1303. The register 1303 identifies that the payment amount does not surpass the money deposited in the IC card 1301, thereby carrying out payment. Then, the register 1303 transmits data of the balance amount after payment to the reader/writer 1304. The reader/writer 1304 can write the data of the balance amount into the integrated circuit (ID chip) 1302 of the IC card 1301.

Note that the reader/writer 1304 may be additionally provided with an input key 1305 for inputting passwords, whereby it can be prevented that payment is made with the IC card 1301 by an unauthorized user.

What is claimed is:

1. An integrated circuit comprising:
   a central processing circuit;
   a power supply level determination circuit generating a power supply data signal;
   a control circuit monitoring a level of external supplied power and an operating state of the integrated circuit and generating an instruction signal containing data for changing a power supply potential and a clock frequency to be supplied to the central processing circuit based on a signal generated from the central processing circuit and the power supply data signal; and
   a connection terminal connected to an antenna,
   wherein the power supply determination circuit comprises a power supply circuit including a load resistor, a reference potential generating circuit, and a comparator circuit for comparing an output potential of the power supply circuit with an output potential of the reference potential generating circuit.

2. An integrated circuit comprising:
   a central processing circuit;
   a memory;
   a power supply level determination circuit generating a power supply data signal;
   a control circuit monitoring a level of external supplied power and an operating state of the integrated circuit and generating an instruction signal containing data for adjusting a power supply potential and a clock frequency to be supplied to the central processing circuit based on a memory access signal generated from the central processing circuit and the power supply data signal; and
   a connecting terminal connected to an antenna,
   wherein the power supply determination circuit comprises a power supply circuit including a load resistor, a reference potential generating circuit, and a comparator circuit for comparing an output potential of the power supply circuit with an output potential of the reference potential generating circuit.

3. An integrated circuit comprising:
a central processing circuit generating an event signal;
a power supply level determination circuit generating a power supply data signal;
a control circuit monitoring a level of external supplied power and an operating state of the integrated circuit and generating an instruction signal containing data for changing a power supply potential and a clock frequency to be supplied to the central processing circuit based on the event signal and the power supply data signal; and
a connection terminal connected to an antenna,
wherein the power supply determination circuit comprises a power supply circuit including a load resistor, a reference potential generating circuit, and a comparator circuit for comparing an output potential of the power supply circuit with an output potential of the reference potential generating circuit.

4. The integrated circuit according to claim 3, wherein the event signal is a signal selected from one or more of: a signal containing data on an operating state of an integer arithmetic unit, a floating point arithmetic unit, a load/store unit or a branch unit included in the central processing circuit; a signal containing data on an execution state of at least one of an integer arithmetic instruction, a floating point arithmetic instruction, a load/store instruction, a branch instruction and a NOP instruction for the plurality of units included in the central processing circuit; and a signal generated by a combinational circuit that includes several units selected from the plurality of units in the central processing circuit.

5. The integrated circuit according to claim 3, wherein the control circuit is provided in the central processing circuit.

6. The integrated circuit according to claim 3, wherein the integrated circuit is provided over one of a glass substrate and a flexible substrate.

7. A wireless chip incorporating the integrated circuit according to claim 3.

8. An integrated circuit comprising:
a central processing circuit;
a power supply circuit;
a clock generating circuit;
a power supply level determination circuit generating a power supply data signal;
a control circuit monitoring a level of external supplied power and an operating state of the integrated circuit and controlling the power supply circuit and the clock generating circuit based on the operating state of the central processing circuit and the power supply data signal; and
a connecting terminal connected to an antenna,
wherein the power supply determination circuit comprises a power supply circuit including a load resistor, a reference potential generating circuit, and a comparator circuit for comparing an output potential of the power supply circuit with an output potential of the reference potential generating circuit.

9. The integrated circuit according to claim 8, wherein the control circuit is provided in the central processing circuit.

10. The integrated, circuit according to claim 8, wherein the integrated circuit is provided over one of a glass substrate and a flexible substrate.

11. A wireless chip incorporating the integrated circuit according to claim 8.

12. An integrated circuit comprising:
a memory;
a central processing circuit generating a memory access signal;
a power supply circuit;
a clock generating circuit;
a power supply level determination circuit generating a power supply data signal;
a control circuit monitoring a level of external supplied power and an operating state of the integrated circuit and controlling the power supply circuit and the clock generating circuit based on the memory access signal generated from the central processing circuit and the power supply data signal; and
a connecting terminal connected to an antenna,
wherein the power supply determination circuit comprises a power supply circuit including a load resistor, a reference potential generating circuit, and a comparator circuit for comparing an output potential of the power supply circuit with an output potential of the reference potential generating circuit.

13. The integrated circuit according to claim 12, wherein the memory access signal is a signal selected from one or more of a signal containing data on an operating state of a memory control unit included in the central processing circuit, a signal containing data on an execution state of a load/store instruction from the central processing circuit, and a signal generated by a combinational circuit that includes several units selected from the plurality of units in the central processing circuit.

14. The integrated circuit according to claim 12, wherein the control circuit is provided in at least one of the central processing circuit and the memory.

15. The integrated circuit according to claim 12, wherein the memory is one or more of an SRAM (Static Random Access Memory), a DRAM (Dynamic Random Access Memory), an EEPROM (Electrically Erasable Programmable Read Only Memory), and a flash memory.

16. The integrated circuit according to a claim 12, wherein the integrated circuit is provided over one of a glass substrate and a flexible substrate.

17. A wireless chip incorporating the integrated circuit according to claim 12.

18. A semiconductor device comprising:
a central processing circuit generating an event signal;
a power supply circuit;
a clock generating circuit;
a power supply level determination circuit generating a power supply data signal;
a control circuit monitoring a level of external supplied power and an operating state of the integrated circuit and controlling the power supply circuit and the clock generating circuit based on the event signal and the power supply data signal; and
an antenna receiving the external power supply by electromagnetic induction that is generated between a reader/writer and the antenna,
wherein the power supply determination circuit comprises a power supply circuit including a load resistor, a reference potential generating circuit, and a comparator circuit for comparing an output potential of the power supply circuit with an output potential of the reference potential generating circuit.

19. The semiconductor device according to claim 18, wherein the event signal is a signal selected from one or more of: a signal containing data on an operating state of an integer arithmetic unit, a floating point arithmetic unit, a load/store unit or a branch unit included in the central processing circuit; a signal containing data on an execution state of at least one of an integer arithmetic instruction, a floating point arithmetic instruction, a load/store instruction, a branch instruction and a NOP instruction for the plurality of units included in the central processing circuit; and a signal generated by a combinational circuit that includes several units selected from the plurality of units in the central processing circuit.

20. The semiconductor device according to claim 18, wherein the control circuit is provided in the central processing circuit.

21. The semiconductor device according to claim 18, wherein the integrated circuit is provided over one of a glass substrate and a flexible substrate.

22. A wireless chip incorporating the semiconductor device according to claim 18.

23. A semiconductor device comprising:
a central processing circuit;
a power supply circuit;
a clock generating circuit;
a power supply level determination circuit generating a power supply data signal;
a control circuit monitoring a level of external supplied power and an operating state of the integrated circuit and controlling the power supply circuit and the clock generating circuit based on the operating state of the central processing circuit and the power supply data signal; and
an antenna receiving the external power supply by electromagnetic induction that is generated between a reader/writer and the antenna,
wherein the power supply determination circuit comprises a power supply circuit including a load resistor, a reference potential generating circuit, and a comparator circuit for comparing an output potential of the power supply circuit with an output potential of the reference potential generating circuit.

24. The semiconductor device according to claim 23, wherein the control circuit is provided in the central processing circuit.

25. The semiconductor device according to claim 23, wherein the integrated circuit is provided over one of a glass substrate and a flexible substrate.

26. A wireless chip incorporating the semiconductor device according to claim 23.

27. A semiconductor device comprising:
a memory;
a power supply circuit;
a clock generating circuit;
a central processing circuit generating a memory access signal;
a control circuit controlling the power supply circuit and the clock generating circuit based on the memory access signal and a level of an external power supply; and
an antenna receiving the external power supply by electromagnetic induction that is generated between a reader/writer and the antenna,
wherein the power supply determination circuit comprises a power supply circuit including a load resistor, a reference potential generating circuit, and a comparator circuit for comparing an output potential of the power supply circuit with an output potential of the reference potential generating circuit.

28. The semiconductor device according to claim 27, wherein the memory access signal is a signal selected from one or more of a signal containing data on an operating state of a memory control unit included in the central processing circuit, a signal containing data on an execution state of a load/store instruction from the central processing circuit, and a signal generated by a combinational circuit that includes several units selected from the plurality of units in the central processing circuit.

29. The semiconductor device according to claim 27, wherein the control circuit is provided in the central processing circuit or the memory.

30. The semiconductor device according to claim 27, wherein the memory is one or more of an SRAM (Static Random Access Memory), a DRAM (Dynamic Random Access Memory), an EEPROM (Electrically Erasable Programmable Read Only Memory), and a flash memory.

31. The semiconductor device according to claim 27, wherein the integrated circuit is provided over one of a glass substrate and a flexible substrate.

32. A wireless chip incorporating the semiconductor device according to claim 27.

* * * * *